United States Patent
Nagoya et al.

(10) Patent No.: US 7,023,765 B2
(45) Date of Patent: Apr. 4, 2006

(54) OPTICAL ELEMENT, OPTICAL PICK-UP DEVICE AND MANUFACTURING METHOD OF THE OPTICAL ELEMENT

(75) Inventors: Hiroshi Nagoya, Hachioji (JP); Shigeru Hosoe, Hachioji (JP)

(73) Assignee: Konica Corporation, Tokyo (JP)

( * ) Notice: Subject to any disclaimer, the term of this patent is extended or adjusted under 35 U.S.C. 154(b) by 600 days.

(21) Appl. No.: 10/237,338

(22) Filed: Sep. 6, 2002

(65) Prior Publication Data
US 2003/0048740 A1    Mar. 13, 2003

(30) Foreign Application Priority Data
Sep. 12, 2001   (JP) .............................. 2001-276431

(51) Int. Cl.
G11B 7/00   (2006.01)

(52) U.S. Cl. ................. 369/44.12; 369/112.23

(58) Field of Classification Search ............ 369/44.23, 369/44.24, 44.12, 112.28, 112.23, 112.01, 369/112.1
See application file for complete search history.

(56) References Cited

U.S. PATENT DOCUMENTS 5,615,203 A *   3/1997   Fukakusa ..................... 720/682
6,700,856 B1 *  3/2004   Ueyanagi ............... 369/112.23

* cited by examiner

Primary Examiner—Nabil Hindi
(74) Attorney, Agent, or Firm—Squire, Sanders & Dempsey L.L.P.

(57) ABSTRACT

An optical element for recording and/or reproducing information of an optical information recording medium, includes an optical element body having an incident surface and an opposite surface opposite to the incident surface, A light flux coming from a light source at an outside is introduced to be incident into an inside of the optical element body and is reflected several times in the inside of the optical element body so that the light flux is converged on the opposite surface; and the incident surface is a refractive surface, is convex toward the light source side and includes an optical axis.

26 Claims, 21 Drawing Sheets

SPHERICAL ABERRATION

SPHERICAL ABERRATION

SPHERICAL ABERRATION

OPTICAL ELEMENT, OPTICAL PICK-UP DEVICE AND MANUFACTURING METHOD OF THE OPTICAL ELEMENT

BACKGROUND OF THE INVENTION

The present invention relates to an optical element and an optical pick-up device which are used when recording or reproducing of information for an optical recording medium such as an optical disk is performed, and to a manufacturing method of the optical element.

In the past, there has been proposed an optical information recording media such as an exclusive optical disk for reproducing, a phase changing type optical disk, a photo-electro-magnetic disk or an optical card, as the recording media for storing the data of video information, audio information or a program for a computer. Further in the recent years, there are strong demands for improving the recording density and for giving a large capacity to these optical information recording media.

For the means to improve the recording density of the optical information recording media, in an optical pick-up device which performs writing and reading of an information signal, it is possible to make a spot diameter of light converged by the light-converging optical element to be smaller, by making a numerical aperture (NA) of a light-converging optical element to be larger, or by shortening the wavelength of a light source.

In an optical recording using near-field light proposed in the recent years, by forming a very small spot less than the wavelength of light by using a probe or SIL (Solid Immersion Lens) having a very small aperture less than the wavelength of light, and by performing the recording or reproducing by making the clearance between an optical head and a recording medium to be less than the wavelength of light source, it is possible to write and read a small mark as a signal less than 200 nm beyond the light diffraction limit.

Here, the near-field light and near-field light recording using the same are explained, referring to FIG. 1. When considering the light-converging optical system wherein light emits from a medium of an optical element (refractive index: n) to an air layer (refractive index: 1, wavelength of light source: $\lambda$, thickness of air: d, $d \leq \lambda$) with a prescribed angle $\theta$ to the optical axis and wherein light converges onto the information recording surface, it is generally known that when angle $\theta$ goes beyond the total reflection critical angle $\theta_1$, light reflects totally and does not enter the air layer. In this case, since refractive index n is expressed by n=1 in the air layer, numerical aperture NA of an image side of the light-converging optical system is expressed by NA=n sin $\theta$<1.0, and a spot diameter is $\lambda$/NA, and accordingly, it has been considered that it is impossible to stop down the spot diameter less than the range of the wavelength.

However, when looking this phenomenon from the view point of an electro-magnetic wave theory, totally-reflected light leaks once to an air layer area, which is called near-field light or evanescent light. The near-field light has the nature that the wavelength is shortened to $\lambda$/n, though the near-field light exists in the air layer. By establishing an air layer clearance between the optical element and the information recording surface to be less than wavelength of a used light source, it is possible to use the near-field light for the light converging, and the recording or reproduction of information can be performed. In this case, since n is greater than one (n>1) in the medium of the optical element, the numerical aperture NA of the image side of the light-converging optical system is written as NA=n sin $\theta$>1.0. That is, it is possible to stop down the spot diameter to be less than the wavelength, which can perform the high density recording. Further, light intensity of a central spot of the near-field light attenuates exponentially for the distance of leakage as shown in FIG. 7. Due to this, in order to perform the correct reading and writing of information, it is necessary to make the distance between a final surface of the optical element and the recording medium to be about the wavelength of the light source, which is well known.

Incidentally, for the near-field light recording technology, there is proposed a SIM (Solid Immersion Mirror) of cata-dioptric system, including a flat shaped reflecting surface having a light transmitting section on the center, a reflecting surface representing a rotated ellipse surface which converges the light onto the above-mentioned light transmitting section, and a refracting interface representing a concave shape which transmits the light, positioned on the center of the above-mentioned reflecting surface. (TOKUKAI 2001-43550)

However, when there is used the so-called glass molding method, wherein a heat softened glass material is pressed by an upper metal mold and an lower metal mold to be the optical surface shape, is used for the mass-production of this kind of the optical element, the following problems will occur. As shown in FIG. 2, pre-form 1 (material of the optical element), representing a first processed goods being nearly a spherical shape when formed, is set on a position slipped from a center of lower metal mold 2A by projected section 2B which forms a concave refracting interface of the optical surface of the metal mold. Concerning optical element 1' formed by the above-mentioned condition, an outermost diameter is off-centered to the optical axis, in a forced-out type molding method by which a forced-out flange becomes a free style, as shown in FIG. 3. This section is used for the positioning of a pick-up device to a lens barrel, which makes the optical surface to shift to the optical axis, and affects adversely to the optical characteristics. Further, in the above-mentioned forced-out type molding method or a filling type molding method having a molding surface on the flanged section, the distribution of pressing pressure at the formation is so uneven to the optical axis that shrinkages are generated, because contraction is concentrated to the portion where the pressure of the optical surface is lower, when the formed optical element is cooled to be solidified, which causes the generation of coma and astigmatism, and affects adversely to the optical characteristics. As for a countermeasure, it is conceivable that the upper metal mold and the lower metal mold of the optical surface are reversed to the case of FIG. 2, and taken is an arrangement in which a flat-shaped second reflective surface is formed by the lower metal mold, however, setting position of the pre-form is not fixed due to the flat surface, and the pre-form rolls easily, which causes the same problem.

As mentioned above, it is necessary that the distance between the optical element and the recording medium is determined to be the wavelength level or less for the near-field light recording, and for the technology that is possible to realize this, there has been proposed a flying head, used for a hard disk drive at present. The flying head is the one that stabilizes a floating amount at the clearance balanced between buoyancy, that is generated during the rotation of a disk by air influx between the disk and the optical element or a slider on which the optical element is loaded, and a load, that forces the disk surface by the optical element or an arm supporting the slider.

At present, it is general that a protective layer is provided on the surface of removable disks such as CD (compact disk) and DVD (digital versatile disk), for the purpose of protecting their recording layers from a dust and scratch. Here, when the protective layer for the recording medium is used for the optical system wherein NA is greater than one, like the near-field light recording, the generated amount of spherical aberration caused by a thickness error of the protective layer is very large. Further, focal depth is very small due to high NA, thereby the light spot diameter is deteriorated by the small change of a focal position, and due to these, the recording/reproducing for information cannot be performed correctly. Accordingly, it is necessary to perform focusing by deviating the converged optical system against unevenness of the thickness of the light-converging optical element or the thickness of the protective layer provided on the recording medium. However, concerning the near-field light recording, since the distance between the optical element for converging the light to the recording layer and the medium is established to be the same as or less than the wavelength level and is fixed, there has been a problem that the stroke for the focusing cannot be obtained in the light-converging optical element.

SUMMARY OF THE INVENTION

The object of the present invention is to provide the optical element which can improve the recording density greatly, as compared with the conventional optical information recording, and to provide the optical pick-up device using this optical element, by using the near-field light.

Further, in view of the aforementioned problems, the object of the present invention is to provide the manufacturing method of the optical element which makes the setting position of the pre-form to be excellent when the optical element is molded in a glass molding method and can obtain an excellent optical characteristics of the molded optical element.

Still further, the object of the present invention is to provide the optical element and the optical pick-up device which can correct the change of the focal position caused by the production error of the optical system such as an axial thickness error of the optical element and the thickness error of the protective layer of the recording medium, and the spherical aberration.

In order to attain the aforementioned objects, the optical element of the present invention is the optical element for recording and/or reproducing of information for the optical information recording medium, wherein the light rays entered from the outside is reflected several times in the optical element to converge the light on the surface that is opposite to the incident surface, and thereby the surface is a refractive surface and is convex to the light source and the optical element includes the optical axis, in the optical element.

The optical element described in Item (1) is the one which performs at least either one of the recording of information or the reproducing of information for the optical information recording medium. That is, light which enters from the outside is reflected several times in the optical element, and light is converged on the surface being opposite to the incident surface. Further, the optical element is characterized in that the surface which the light enters is a refractive interface, and it is convex to the light source side and includes the optical axis. By making the incident light to reflect several times in the optical element, it is possible to make NA to be large, without generating chromatic aberration. Due to this, it is possible to realize the optical element which can be used for high density recording/reproducing. The above-mentioned optical information recording medium is the phase changing type recording medium or the electromagnetic recording medium, to which the invention is not limited.

The optical element described in Item (2) is characterized in that there is a stop for controlling unnecessary light, when information recording/reproducing is performed. When the light beyond the prescribed value of NA enters, the very large spherical aberration is generated, because the optical element of the invention is used with very high NA, which causes the problems that the spot of the converged light becomes large, or the contrast is reduced. Then the reduction of S/N ratio is caused, and the correct recording/reproducing of information cannot be performed. In this case, the unnecessary light is stopped by providing a stop on the optical element of the invention which controls the light rays, and the above-mentioned problem can be solved.

In the optical element described in Item (3), having a first refracting interface with a prescribed area on the optical axis, shaped to be convex at the light source side which the light from the outside enters, a second reflective surface which reflects the light from the first refractive interface, and a third reflective surface which reflects the light from the second reflective surface again, and providing a light transmittance section that light passes on a central section around the optical axis on the second reflective surface, when the power structure of the optical surface is established so that the following relation is satisfied, $$0 < R1 < R3 < R2$$

here
R1: radius of curvature of the first refractive interface (in case of an aspheric surface, radius of a paraxial curvature)
R2: radius of curvature of the second reflective surface (in case of an aspheric surface, radius of a paraxial curvature)
R3: radius of curvature of the third reflective surface (in case of an aspheric surface, radius of a paraxial curvature), the light that entered the incident surface is once converged in the optical element, reflected by the second reflective surface, further reflected by the third reflective surface, and passes through the light transmittance section formed on the central section of the second reflective surface, and is converged to the recording layer of the recording medium. Generally, the relation among the diameter of the incident light flux to the optical system, the focal length, and the numerical aperture of the image side can be described as follows.

$$D/2 \propto f \cdot NA$$

here,
D: diameter of the incident light flux
F: focal length
NA: numerical aperture of image side In the formula shown above, in order to obtain the higher NA, it is only to make the diameter of the incident light flux greater, or to make the focal length to be shorter, however, when the former is chosen, the optical system itself becomes greater, which causes the increase of the weight or the increase of the aberration. Further when the latter is chosen, it is difficult to obtain the sufficient thickness of the optical element. In the optical element of the present invention, the optical path is a so-called retrofocus type, which can attain the higher NA, without making the diameter of the incident light flux larger.

In a semiconductor laser which belongs to a main current for the light source of the optical recording at present, the oscillating wavelength changes in the range of ±1 nm, due to the temperature change of the environment where the semiconductor laser is used and the output change at the changeover time of the recording/reproducing. Due to this, the light spot is deteriorated on the optical spot where longitudinal chromatic aberration has been generated, which affects adversely to the operation of recording/reproducing. However for this problem, by using a retrofocus type, the present optical system has a short focal length, and a small height of the incident light at the refractive interface, and thereby, the present optical system can reduce remarkably the longitudinal chromatic aberration that is generated when the wavelength changes, as mentioned above. Accordingly, the optical element of the present invention can perform the correct recording/reproducing, even when the wavelength of the light source changes ±1 nm.

In the optical element of the present invention, by forming the above-mentioned first refractive interface positioned at the center of the third reflective surface to be convex to the light source side, that is, R>0 (R: radius of curvature of the first reflective surface, in case of an aspheric surface, radius of paraxial curvature), the shape of the metal mold (lower mold) 3A forms the shape of concave section 3E which is more concave than the third reflective surface, as shown in FIG. 4. With this formation, pre-form 1, representing the first product shaped nearly spherical when molded by the glass molding method, can be set easily, because the pre-form 1 can be positioned by the concave section 3E, when the pre-form is set to the center. When the molding is performed under the above-mentioned condition, the optical axis of the optical element 3B can coincide with the center axis of the metal mold 3A, as shown in FIG. 5. Accordingly, the outermost outside diameter of the flange section is not deflected from the optical axis, and when the optical element is installed on the lens barrel of a pick-up, the influence on the optical characteristics can be cleared. Further, since the pressure distribution of the press to the pre-form becomes even while molding, the molding shape is transferred to the optical surface evenly by the press. Accordingly, since whole of the optical surface contracts evenly during the cooling and solidification, astigmatism or coma is not generated by the shrinkages, and high optical characteristics can be kept.

To improve the recording density in the optical recording, it is only to make the spot diameter of light used for the information recording or reproducing to be smaller. For its performance, listed are to make the wavelength of the used light source to be short and to make NA of the light-convergent optical system to be higher. Concerning the shortening of the light source wavelength, the red laser having 650 nm wavelength is used in DVD, for example, a blue-purple laser (wavelength: 405 nm) is searched for the practical use. Concerning the high NA, it is necessary to make the refractive power of the light-convergence optical system to be larger, however, a maximum normal angle of the optical surface becomes also larger, and there is a tendency for the processing of the optical surface of the metal mold to be difficult. Due to this, in order to control the increase of the manufacturing difficulty, it is desired that a high refractive material is applied to the optical element. The recording density of DVD is 4.32 Mb/mm$^2$ at present, and in order to improve it greatly, or about 10 times for example, if a material having nd≧1.55 (nd: refraction index of the material forming the optical element measured by d line) is selected for the material of the optical element of the present invention, the maximum normal angle on the optical surface, nearly as same as the conventional material, is obtained, and it is possible to obtain high NA without increasing the difficulty for the production, still further, cost down and man-hour reduction can be expected. In particular, for the realization of the high density recording/reproducing, if a high refraction index glass, represented by a material having nd≧1.8 (nd: refraction index of the material forming the optical element measured by d line), is used for the material of the optical element, NA can be established to be very large for the optical element of the present invention. Generally, the high refraction index glass has not only a high refraction index but also a large chromatic dispersion, when the high refraction index glass is applied for the objective lens of the conventional refraction system, it cannot be employed for the practical use, because the large chromatic aberration is generated by the above-mentioned wavelength change of the light source. However, since most of the light-converging power is shouldered by the reflective surface in the present invention, the longitudinal chromatic aberration is so small that the high refractive glass can be employed, as mentioned above.

Further, when the method wherein the molding is conducted by the upper metal mold and the lower metal mold like the above-mentioned glass molding method is applied, it is necessary to control the centering of the upper and lower metal molds strictly, to maintain the high optical characteristics of the optical element to be molded. In this case, the part having the molded optical surface is requested to have a high mechanical accuracy, and there happens the increase of the production cost and the malfunction such as a binding caused by the small allowance of the engaged section. To solve this problem, by making the second reflective surface of the optical element to be a flat shape like Item (4), there is no need to consider the shift eccentric of the upper metal mold and the lower metal mold to the center axis, because the surface of the metal mold 3D can be made to be the flat surface like upper metal mold 3C in FIG. 5. That is, the difficulty in the manufacturing, such as the production of the optical surface of the metal mold and the strict tolerance of the molded part, can be reduced so remarkably that the reliability of the machine movement is improved and the cost down is also performed. Further, when the above-mentioned fling head is applied, if a facing surface to the disk is a flat shape, buoyancy caused by dynamic pressure works on the surface facing to disk evenly, and the optical element or the slider on which the optical element is loaded is easily stabilized, which is in good order.

The above-mentioned optical element is characterized in that there is provided a projection that is convex to the optical information recording medium side, at the optical axial center of the second reflective surface as shown in Item (5). That is, by providing projection 4 on the light exit section of the optical element in FIG. 6, it is possible to install thin film coil 5 for the magnetic modulation. Accordingly, by radiating laser whose intensity is changed by the optical modulation circuit in accordance with a record signal, with applying a magnetic field to the prescribed direction, it is possible to form a magnetic pattern based on the record signal on the recording surface. Further, by arranging heads on the both side of the recording medium, it is possible to record information on the both side, which multiplies the recording volume.

Since the optical element in Item (6) is characterized in that the clearance between the last surface of the optical element and the optical information recording medium is installed to be shorter than the wavelength of the used light, the clearance between the optical element and the recording medium is kept shorter than the wavelength of the light source to be used. FIG. 7 shows a profile of light intensity when the above-mentioned clearance is changed. As it is clear from FIG. 7, if the clearance between the optical element and the recording medium is kept shorter than the wavelength of the light source, the reduction of the light intensity, which occurs while the near-field light travels to the recording medium, is controlled, and it is possible to perform the correct recording and/or reproducing of information having a high S/N ratio.

Further, when the above-mentioned optical pick-up device is made to be a so-called finite conjugate type which converges the diverging light from the light source on the recording surface of the optical information recording medium as shown in Item (7), there is no need to use a coupling lens which changes the diverged light from the light source 6 to the nearly paralleled light as shown in FIG. 8, and thereby, the size of the optical pick-up device is minimized, and the cost of the optical pick-up device is saved.

As shown in Item (8), since the parallel light flux entering the above-mentioned optical element is made to be a so-called infinite conjugate type which converges on the information recording surface of the optical information recording medium as shown in FIG. 9, a shift eccentric tolerance to the optical axis of the light source can be less strict. Due to this, an accuracy of an outside diameter of the optical part can be less strict, and man-hour for assembling the optical system can be reduced.

Further, the above-mentioned optical information recording medium is characterized in that there is provided a protective layer on the information recording surface. When information is recorded on the surface of the recording medium, or information recorded on the surface of the recording medium is regenerated, the optical element of the present invention keeps the clearance for the near-field area so that the last surface of the optical element on the recording medium side and the recording surface are bonded optically each other. On the other hand, when there is the protective layer on the recording medium as shown in Item (9), it is necessary that the optical element of the present invention keeps the clearance of the near-field area so that the last surface of the optical element on the recording medium side and the recording surface are bonded optically each other. The principle is as follows. As shown in FIG. 10, light, which travels through the optical element as normal light 6A and satisfies the total reflection condition when it exits from the last surface to the air layer, leaks slightly to be near-field light 6B. When recording medium 6C having the protective layer approaches the distance less than the wavelength from the optical element, light that entered the protective layer as near-field light becomes normal light 6D again and can reach the recording surface. Accordingly, when information recording and/or reproducing using near-field light is performed by the optical element of the present invention, it is possible to employ the surface recording method having no protective layer or having a very thin protective layer less than 50 nm thick, or the surface recording method having a very thick protective layer more than 50 nm thick. Incidentally, in the former case, that is the surface recording method, since a scratch or dust on the surface causes the damage on the recording medium directly, or causes shadows of the convergent light flux, which causes the deterioration of the reliability of recording/reproducing, it is important to make the recording medium and the optical element to be an airtight construction, to make a pick-up system isolated from the outside for scratch, dirt or dust. However, in the latter case, that is the surface recording method having a relatively thick protective layer, since the light flux converging on the recording surface becomes a large light flux sectional area on the surface of the protective layer, the light amount reduction and the light scattering do not become large compared with the total amount of light, even though there are a small amount of scratches, dusts or finger prints on the surface, and thereby the reliability of recording/reproducing is hardly deteriorated. Accordingly there is no need to make an airtight construction for protecting the recording medium from scratch or dirt, the system has better handling, and the recording medium can be made to be a cheap structure. Accordingly, the latter has large merit for a removable disk use, however the scope of the present invention is not limited to the latter method.

When there is provided the protective layer on the recording medium as mentioned above, it is known that the aberration is generated as follows, based on the thickness of the protective layer and its thickness error.

$$\Delta SA \propto NA^4 \cdot \Delta t$$

$$\Delta COMA \propto NA^3 \cdot t$$

here, $\Delta SA$: spherical aberration generated by the change of the thickness of the protective layer NA: numerical aperture of the image side $\Delta t$: changing amount of the thickness of the protective layer $\Delta$ COMA: coma generated by the gradients of the optical element to the recording medium t: thickness of the protective layer On the contrarily, if the thickness of the protective layer provided on the recording surface is not less than 50 nm and not greater than 1 mm shown in Item (10), it is possible to reduce the change of the thickness generated during the manufacturing of the protective layer or the deterioration of the optical characteristics such as spherical aberration or coma generated in proportion to the thickness. In this case, if the thickness of the protective layer is less than 50 nm, it is almost impossible to have effect on a dust on the protective layer. On the other hand, if it is greater than 1 mm, the control of an error of the protective layer is so difficult that spherical aberration is deteriorated, and coma for abaxial light is generated remarkably.

The optical element described in Item (11) is characterized in that an optical glass is the material of the optical element. As mentioned above, the wavelength of leaked near-field light is shown by $\lambda/n$ ($\lambda$: wavelength of the light source, n: refractive index of the material of the optical element), the spot diameter of the converged light is also reduced by 1/n. Accordingly, in the optical element of the present invention which performs the near-field light recording, it is very effective that the optical glass having a high refractive index, or nd is greater than 2.0, is used for the material of the optical element. Further, thermal expansion characteristics of the optical glass is so low and the thermal dependency of the refractive index of the optical glass is so low that the optical glass can be used on the wide extent of the environment.

The optical element in Item (12) is characterized in that an optical plastic is the material of the optical element. The optical element made of the optical plastic weighs so low that it is possible to make its trailing ability high, when the optical element is installed on the above-mentioned flying head. Further, the molding processing is performed so easily that the mass production can be performed cheaply by the injection molding processing method.

The optical element described in Item (13) is the one which performs at least either one of the recording of information or the reproducing of information for the optical information recording medium, and provides the light source, the optical element that converges the light flux from the light source on the information recording surface of the optical information recording medium, and the optical detector that detects light from the recording medium. Further, the optical element is characterized in that the optical element converges incident light from the outside on the surface opposite to the incident surface, by making the incident light to reflect several times in the optical element, further characterized in that the surface that the light enters is a refracting interface, and it is convex to the light source side and includes the optical axis. By making the incident light to reflect several times in the optical element, it is possible to make NA to be large, without generating chromatic aberration. Due to this, it is possible to realize the optical pick-up device which can be used for high density recording/reproducing. The above-mentioned optical information recording medium is the phase changing type recording medium or the electro-magnetic recording medium, to which the invention is not limited.

It is preferable that the optical pick-up device has a stop for controlling unnecessary light, when information recording/reproducing is performed, as described in Item (14). When the light beyond the prescribed value of NA enters, the very large spherical aberration is generated, because the optical element of the invention is used with very high NA, which causes the problems that the spot of the converged light becomes very large, or the contrast is reduced. Then the reduction of S/N ratio is caused, and the correct recording/reproducing of information cannot be performed. In this case, the unnecessary light is stopped by providing a stop on the optical pick-up device which controls the light rays, and the above-mentioned problem can be solved.

Item (15) relates to a preferable optical element in the above-mentioned optical pick-up device. That is, the optical element is composed of a first refracting interface shaped convex at the light source side which the light from the outside enters, a second reflective surface which reflects light from the first refractive interface, and a third reflective surface which reflects light from the second reflective surface again, and there is provided a light transmittance section that light passes on the center of the second reflective surface, wherein the following condition are satisfied.

$$0 < R1 < R3 < R2$$

here
R1: radius of curvature of the first refractive interface (in case of an aspheric surface, radius of a paraxial curvature)
R2: radius of curvature of the second reflective surface (in case of an aspheric surface, radius of a paraxial curvature)
R3: radius of curvature of the third reflective surface (in case of an aspheric surface, radius of a paraxial curvature), when the power structure of the optical surface is established so that the relation $0 < R1 < R3 < R2$ is satisfied, the light that entered the incident surface is once converged in the optical element, reflected by the second reflective surface, further reflected by the third reflective surface, and passes through the light transmittance section formed on the central section around the optical axis of the second reflective surface, and is converged to the recording layer of the recording medium. Generally, the relation among the diameter of the incident light flux to the optical system, the focal length, and the numerical aperture of the image side can be described as follows.

$$D/2 \propto f \cdot NA$$

here,
D: diameter of the incident light flux
F: focal length
NA: numerical aperture of image side In the formula shown above, in order to obtain the higher NA, it is only to make the diameter of the incident light flux greater, or to make the focal length to be shorter, however, when the former is chosen, the optical system itself becomes greater, which causes the increase of the weight or the increase of the aberration. Further when the latter is chosen, it is difficult to obtain the sufficient thickness of the optical element. In the above-mentioned optical element, the optical path is a so-called retrofocus type, which can attain the higher NA, without making the diameter of the incident light flux larger.

In a semiconductor laser which belongs to a main current for the light source of the optical recording at present, the oscillating wavelength changes in the range of ±1 nm, due to the temperature change of the environment where the semiconductor laser is used and the output change at the changeover time of the recording/reproducing. Due to this, the light spot is deteriorated on the optical spot where longitudinal chromatic aberration has been generated, which affects adversely to the operation of recording/reproducing. However for this problem, by using a retrofocus type, the present optical system has a short focal length, and a small height of the incident light at the refractive interface, and thereby, the present optical system can reduce remarkably the longitudinal chromatic aberration that is generated when the wavelength changes, as mentioned above. Even when the wavelength of the light source changes ±1 nm, the optical pick-up device of the present invention can perform the correct recording/reproducing, without specially providing the optical element to correct the chromatic aberration, and the optical pick-up device can be structured simply and cheaply.

In the optical element which is used in the optical pick-up device of the present invention, by forming the above-mentioned first refractive interface positioned at the center of the third reflective surface to be convex to the light source side, that is, R>0 (R: radius of curvature of the first reflective surface, in case of an aspheric surface, radius of paraxial curvature), the shape of the metal mold 3A becomes more concave than the third reflective surface, as shown in FIG. 4. With this formation, pre-form 1, representing the first product shaped nearly spherical when molded by the glass molding method, can be easily set to the center. When the molding is performed under the above-mentioned condition, the optical axis of the optical element 3B can coincide with the center axis of the metal mold 3A nearly, as shown in FIG. 5. Accordingly, the outermost outside diameter of the flange section is not deflected from the optical axis, and when the optical element is installed on the lens barrel of a pick-up, the influence on the optical characteristics can be cleared. Further, since the pressure distribution of the press to the pre-form becomes even while molding, the molding shape is transferred to the optical surface evenly by the press. Accordingly, since whole of the optical surface contracts evenly during the cooling and solidification, astigmatism or coma is not generated by the shrinkages, and the optical pick-up device employing the optical element of the present invention can keep high optical characteristics for the information recording/reproducing.

To improve the recording density in the optical recording, it is only to make the spot diameter of light used for the information recording or reproducing to be smaller. For its performance, listed are to make the wavelength of the used light source to be short and to make NA of the light-convergent optical system to be higher. Concerning the shortening of the light source wavelength, the red laser having 650 nm wavelength is used in DVD, for example, a blue-purple laser (wavelength: 405 nm) is searched for the practical use. Concerning the high NA, it is necessary to make the refractive power of the light-convergence optical system to be larger, however, a maximum normal angle of the optical surface becomes also larger, and there is a tendency for the processing of the optical surface of the metal mold to be difficult. Due to this, in order to control the increase of the manufacturing difficulty, it is desired that a high refractive material is applied to the optical element. The recording density of DVD is 4.32 Mb/mm$^2$ at present, and in order to improve it greatly, or about 10 times for example, if a material having nd$\geqq$1.55 (nd: refraction index of the material forming the optical element measured by d line) is selected for the material of the optical element employed in the optical pick-up device of the present invention, the maximum normal angle on the optical surface, nearly as same as the conventional material, is obtained, and it is possible to obtain high NA without increasing the difficulty for the production so much, still further, cost down and man-hour reduction can be expected. For the realization of the high density recording/reproducing in the optical pick-up of the present invention, if a high refraction index glass, represented by a material having nd$\geqq$1.8 (nd: refraction index of the material forming the optical element measured by d line), is used for the material of the optical element, NA can be established to be very large for the optical element of the present invention. Generally, the high refraction index glass has not only a high refraction index but also a large chromatic dispersion, though the high refraction index glass is applied for the objective lens of the conventional refraction system, it cannot be employed for the practical use, because the large chromatic aberration is generated by the above-mentioned wavelength change of the light source. However, since most of the light-converging power is shouldered by the reflective surface in the present invention, the longitudinal chromatic aberration is so small that the high refractive glass can be employed, as mentioned above.

Further, when the method, wherein the molding is conducted by the upper metal mold and the lower metal mold like the above-mentioned glass molding method, is applied for the manufacturing method of the optical element which is employed in the optical pick-up device of the present invention, it is necessary to control the centering of the upper and lower metal molds strictly, to maintain the high optical characteristics of the optical element to be molded. In this case, the part having the molded optical surface is requested to have a high mechanical accuracy, and there happens the increase of the production cost and the malfunction such as a binding caused by the small allowance of the engaged section. To solve this problem, by making the second reflective surface of the optical element to be a flat shape like Item (16), there is no need to consider the shift eccentric of the upper metal mold and the lower metal mold to the optical axis, because the surface of the metal mold 3D can be made to be the flat surface like upper metal mold 3C in FIG. 5. That is, the difficulty in the manufacturing, such as the production of the optical surface of the metal mold and the strict tolerance of the molded part, can be reduced so remarkably that the reliability of the machine movement is improved and the cost down is also performed, causing the cost down of the optical pick-up device. Further, when the above-mentioned fling head is applied, if a facing surface to the disk is a flat shape, buoyancy caused by dynamic pressure works on the surface facing to disk evenly, and the optical element or the slider on which the optical element is loaded is easily stabilized, and thereby the optical pick-up device wherein the present optical element is employed can perform the correct recording/reproducing, even though there are some vibrations.

The above-mentioned optical element is characterized in that there is provided a projection that is convex to the optical information recording medium side, at the optical axial center of the second reflective surface as shown in Item (17). That is, by providing projection 4 on the light exit section of the optical element in FIG. 6, it is possible to install thin film coil 5 for the magnetic modulation in the optical pick-up device. Accordingly, by radiating laser whose intensity is changed by the optical modulation circuit in accordance with a record signal, with applying a magnetic field to the prescribed direction, it is possible to form a magnetic pattern based on the record signal on the recording surface. Further, by arranging heads on the both side of the recording medium, it is possible to record information on the both side, which multiplies the recording volume.

The above-mentioned optical pick-up device in Item (18) is characterized in that the clearance between the last surface of the optical element and the optical information recording medium is installed to be shorter than the wavelength of the used light. That is, since the clearance between the optical element and the recording medium is kept shorter than the wavelength of the light source, the reduction of the light intensity while the near-field light travels the recording medium is controlled as shown in FIG. 7, and thereby it is possible to perform the correct recording and/or reproducing of information having a high S/N ratio in the optical pick-up device.

Further, as shown in Item (19), employing a so-called finite conjugate type which converges the diverging light from the light source on the recording surface of the optical information recording medium, there is no need to use a coupling lens which changes the diverged light from the light source 6 to the nearly paralleled light as shown in FIG. 8, and thereby, the size of the optical pick-up device is minimized and the cost of the optical pick-up device is saved.

As shown in Item (20), it is preferable that the optical element is made to be an infinite conjugate type which converges the parallel light flux on the information recording surface of the optical information recording medium. That is, by employing the so-called infinite type wherein the parallel incident light is converged on the recording surface of the optical information recording medium as shown in FIG. 9, the shift eccentric tolerance to the optical axis of the light source can be less strict in the optical pick-up device. Due to this, an accuracy of the outside diameter of the optical system part can be less strict, and man-hour for assembling the optical system can be saved, for the production of the optical pick-up device.

In the above-mentioned optical pick-up device, when information is recorded on the surface of the recording medium, or information recorded on the surface of the recording medium is regenerated, the optical element keeps the clearance for the near-field area so that the last surface of the optical element on the recording medium side and the recording surface are bonded optically each other. On the other hand, when there is the protective layer on the recording medium as shown in Item (21), it is also necessary that the optical element keeps the clearance so that the last surface of the optical element on the recording medium side and the recording surface are bonded optically each other. The principle is as follows. As shown in FIG. 10, light, which travels through the optical element as normal light 6A and satisfies the total reflection condition when it exits from the last surface to the air layer, leaks slightly to be near-field light 6B. When recording medium 6C having the protective layer approaches the distance less than the wavelength from the optical element, light that entered the protective layer as near-field light becomes normal light 6D again and can reach the recording surface. Accordingly, when information recording and/or reproducing using near-field light is performed by the optical element in the optical pick-up device of the present invention, it is possible to employ the surface recording method having no protective layer or having a very thin protective layer less than 50 nm thick, or the surface recording method having a very thick protective layer more than 50 nm thick. Incidentally, in the former case, that is the surface recording method, since a scratch or dust on the surface causes the damage on the recording medium directly, or causes shadows of the convergent light flux, which causes the deterioration of the reliability of recording/reproducing, it is important to make the recording medium and the optical element to be an airtight construction, to make a pick-up system isolated from the outside for scratch, dirt or dust. However, in the latter case, that is the surface recording method having a relatively thick protective layer, since the light flux converging on the recording surface becomes a large light flux sectional area on the surface of the protective layer, the light amount reduction and the light scattering do not become large compared with the total amount of light, even though there are a small amount of scratches, dusts or finger prints on the surface, and thereby the reliability of recording/reproducing is hardly deteriorated. Accordingly there is no need to make an airtight construction for protecting the recording medium from scratch or dirt, the system has better handling, and the recording medium can be made to be a cheap structure. Accordingly, the latter has large merit for a removable disk use, however the scope of the present invention is not limited to the latter method.

When there is provided the protective layer on the recording medium as mentioned above, it is known that the aberration is generated as follows, based on the thickness of the protective layer and its thickness error.

$$\Delta SA \propto NA^4 \cdot \Delta t$$

$$\Delta COMA \propto NA^3 \cdot t$$

here, $\Delta SA$: spherical aberration generated by the change of the thickness of the protective layer NA: numerical aperture of the image side $\Delta t$: changing amount of the thickness of the protective layer $\Delta COMA$: coma generated by the gradients of the optical element to the recording medium t: thickness of the protective layer On the contrariy, if the thickness of the protective layer provided on the recording surface is not less than 50 nm and not greater than 1 mm shown in Item (22), it is possible to reduce the change of the thickness generated during the manufacturing of the protective layer or the deterioration of the optical characteristics such as spherical aberration or coma generated in proportion to the thickness, in the optical pick-up device. In this case, if the thickness of the protective layer is less than 50 nm, it is almost impossible to have effect on a dust on the protective layer. On the other hand, if it is greater than 1 mm, the control of an error of the protective layer is so difficult that spherical aberration is deteriorated, and coma for abaxial light is generated remarkably.

The optical element described in Item (23) is characterized in that an optical glass is the material of the optical element. As mentioned above, the wavelength of leaked near-field light is shown by $\lambda/n$ ($\lambda$: wavelength of the light source, n: refractive index of the material of the optical element), the spot diameter of the converged light is also reduced by $1/n$. Accordingly, in the optical pick-up device of the present invention which performs the near-field light recording, it is very effective that the optical glass having a high refractive index, or nd is greater than 2.0, is used for the material of the optical element. Further, the thermal expansion characteristics of the optical glass is so low and the thermal dependency of the refractive index of the optical glass is so low that the optical glass can be used on the wide extent of the environment.

The optical element in Item (24) is characterized in that the optical plastic is the material of the optical element. The optical element made of the optical plastic weighs so low that it is possible to make its trailing ability high, when the optical element is installed on the above-mentioned flying head in the optical pick-up device. Further, the molding processing is performed so easily that the mass production can be performed cheaply by the injection molding processing method.

When the error is occurred in the thickness of the optical element against the designed value for the production, it happens that the focus position is changed or the spherical aberration is occurred. Further, when the protective layer is coated on the recording medium, the change of the thickness causes the same matter. Due to this, the light-converging optical system is brought to a focus usually so that the optimum light spot is formed on the recording layer, which is difficult for performing the near-field light recording, as mentioned above. The method to solve this is explained by FIG. 11. That is, in the optical pick-up device shown in Item 25, correcting means 7, structured by more than one piece of the optical element, is arranged between the light source and the above-mentioned optical information recording medium. In this case, for example, one-axial electromagnetic actuator 8 is provided on at least one piece of the optical element among the above-mentioned correcting means 7, which makes the changing of the direction to the optical axis possible. By making the optical element to change along the optical axis, it is possible to change an incident angle of the light entering the last optical element, and due to this, it is possible to correct the change of the focus position and/or the spherical aberration, caused by the thickness change of the optical element, the thickness change of the protective layer, and the error occurred while assembling the optical system.

It is preferable that the above-mentioned movable element in Item (26) is formed of the optical plastic material. Since the formation of the movable element by the optical plastic material makes it possible to realize the light weight construction, it is possible to ease the burden to the actuator, perform quick movement, or save the power consumption, when the focusing is conducted in the optical pick-up device. Further it is possible to perform mass-production by the injection molding method cheaply.

Further, the manufacturing method of the optical element of the present invention is characterized in that, when the optical element, having a convex section formed including an optical axis on a part of the surface, is formed, the optical element is formed by a lower metal mold and an upper metal mold which form a concave section corresponding to the convex section.

This manufacturing method can produce the optical element having high optical characteristics, because when nearly spherical glass material is set on the lower metal mold to be molded, the positioning of the material is so easy in the lower metal mold that the molded optical element is not off-centered from the optical axis even on the outermost outside diameter, and the distribution of the pressing pressure to the material during the molding is so even that the optical surface is transferred to be pressed to the molding metal even.

Further, there is no need to consider the shift eccentric of the upper and lower metal molds to the central shaft, because the surface opposite to the above-mentioned surface is flat in the optical element, and because the upper metal mold forms the flat surface when the molding is performed, accordingly the difficulty in the manufacturing, such as the production of the optical surface of the metal mold and the strict tolerance of the molded part, can be reduced so remarkably that the reliability of the machine movement is improved and the cost down is also performed.

The manufacturing method of the present invention is suitable when it is used for the production of the optical element of the present invention, however the manufacturing method is not limited to the production of the optical element.

DETAILED DESCRIPTION OF THE PREFERRED EMBODIMENT

The concrete examples of the optical element of the present invention and the optical system including the optical element are described as the embodiments in the following, and next, the optical pick-up device of the embodiment of the invention is described.

Examples 1,2,3 and 4 are described referring to the attached drawings. The aspheric surface of the optical element in each example is expressed by the following formula, with the optical axis to be the x-axis. Incidentally, the aspheric formula of the present invention is not limited to this.

$$x=(h^2/R)/[1+\sqrt{(1-(1+k)(h^2/R^2))}]+A4h^\square+A6h^6+\ldots$$

where,
A4, A6, . . . : aspherical coefficient
k: constant of the cone
R: paraxial radius of curvature
h: distance from the optical axis

EXAMPLE (1)

Figure 12:
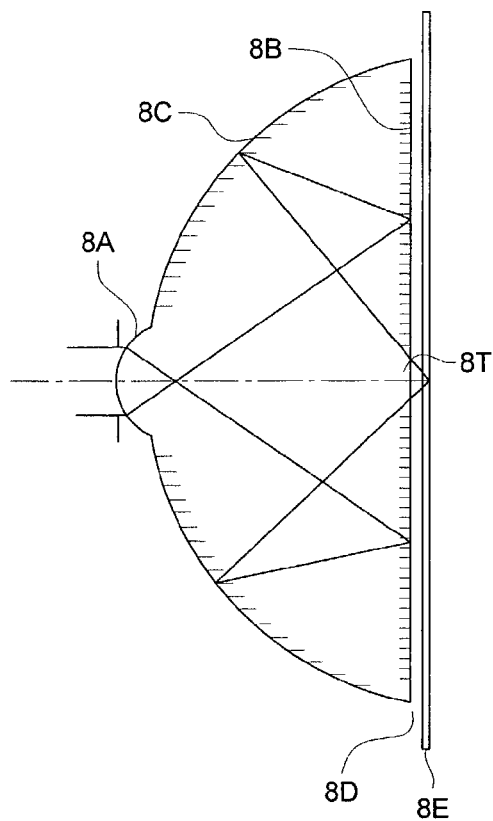
FIGS. 12(a) and 12(b) show the section and the light path of the optical element of Example (1).
Figure 12:
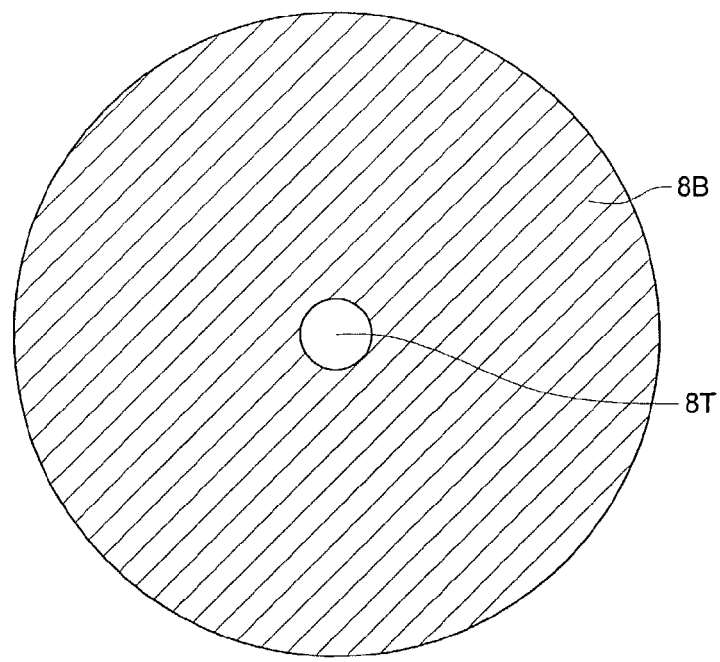

FIG. 12 shows the section and the light path of the optical element for Example (1). The optical element is composed of first refractive interface 8A which is an aspheric surface convex to the light source side, making a prescribed area including the optical axis to be an effective diameter, second reflective surface 8B which is a flat surface, and whose central section around the optical axis is transmittable for light, and third reflective surface 8C which is an aspheric surface convex to the light source side.

Near-field area 8D between the recording medium and the optical element, set to be 80 nm for its distance, performs recording or reproducing by receiving the near-field light. Incidentally, the near-field area is drawn exaggeratingly in the drawing. The main designing data of the present example are shown as follows. Power number of 10 ( for example, $2.5\times10^{-3}$) is shown by E or e (for example, 2.5×E-3) in the designing data and the drawings.

NA1.5, λ=660 nm, diameter of the entrance pupil 0.177 mm material of the optical element: telulight glass nd=2.07425, vd =19.7 material of the protective layer of the recording medium: polycarbonate nd=1.58300, vd=30.0, t=0.03 mm radius of curvature and aspheric coefficient of the optical element: R1=0.10975 mm, K=−0.927142, A4=0.662330E+02, A6=0.388250E+04, A8=−0.157555E+06, A10=0.307742E+08

R2=∞

R3=1.06504 mm, K=−0.084692, A4=0.412300E−04, A6=−0.402342E−04, A8=−0.105614E−02

In Example (1), maximum normal angle of the first refractive interface 8A is 49.8°, that is smaller than that of a DVD objective lens with NA0.6, and the inventor could produce the metal mold surface having the shape accuracy of 52 nm. Further, since the second reflective surface 8B is a flat surface, the inventor could produce the metal mold surface having the shape accuracy of less than 30 nm. When the inventor molded the optical element with glass mold using the metal molds, the inventor could install the preform in the center of the metal mold correctly, and even in a force-out type molding method in which a flange section is to be a free style, the outside diameter was not shifted from the optical axis, and when the optical element is installed on the lens barrel, the high optical characteristics was kept.

As shown by the hatching in FIG. 12, an aluminum is coated in order to increase the reflection on the second reflective surface 8B excluding a circular section (light transmitting section) 8T of the center whose radius is 0.05 mm, and the third reflective surface 8C, and further, SiO□ layer is coated on the aluminum coating, to protect the surface and to prevent the oxidation of the aluminum coating. It is preferable that the light transmitting section located at the center around the optical center of the second reflective surface 8B has the enough aperture which does not eclipse the ray of light necessary for the information recording/reproducing. As a result of checking the diameter of the converged light, that works for the information recording/reproducing, of the optical element which is made in the present example, the diameter is 0.36 μm, which is nearly the ideal optical characteristics. When this is applied to the optical pick-up device, the estimated recording density is about 26.4 $Mb/mm^2$, which can improve the recording density about six times of a DVD. Further, protective layer 8E having the thickness of 30 μm is provided on the recording surface of the optical recording medium, which prevents the deterioration of the regenerated signal, caused by the adhesion of the dust or finger print, and the scratch, and thereby, the optical disk can be taken out from the device for the handling.

Figure 13:
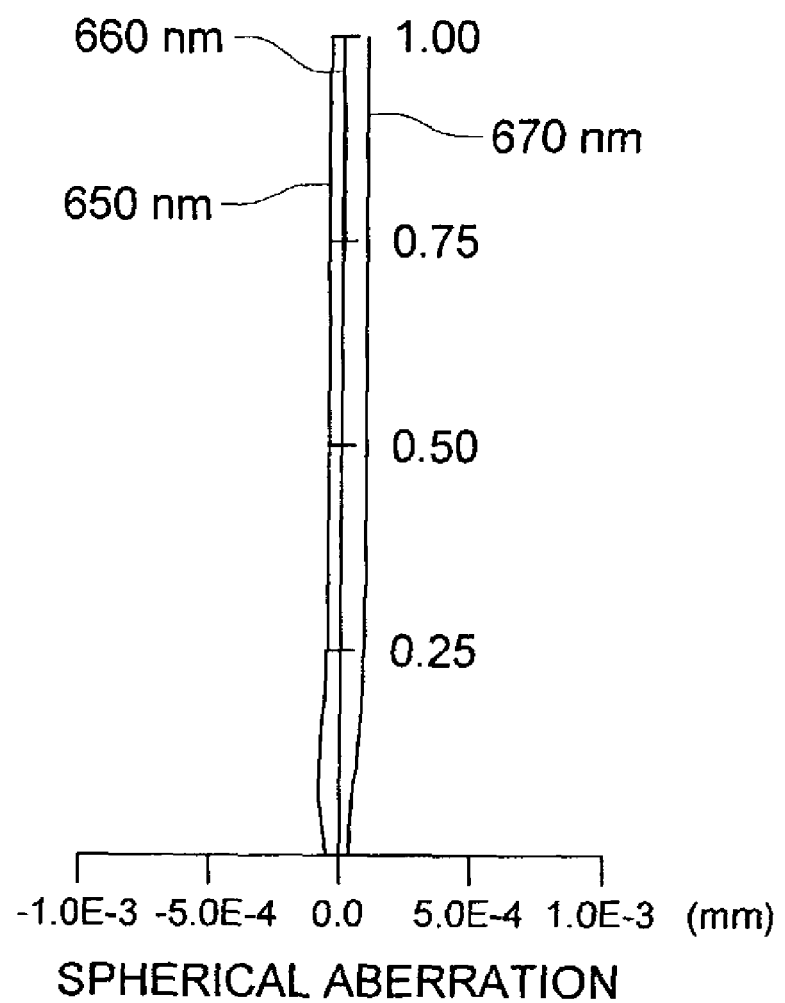
FIG. 13 is a drawing of spherical aberration of the optical element of Example (1).

FIG. 13 is the drawing of the spherical aberration generated in the optical element of the present example. It is possible to correct the spherical aberration to be nearly zero, because the aspheric surfaces are employed for the first refractive interface 8A and the third reflective surface 8C. Further, since the longitudinal chromatic aberration to the change of the wavelength of ±10 nm is not generated nearly, it can be understood that there is nearly no influence on the operation of the recording/reproducing of information, even when the light source wavelength is changed about ±1 nm by the change of temperature.

EXAMPLE (2)

Figure 14:
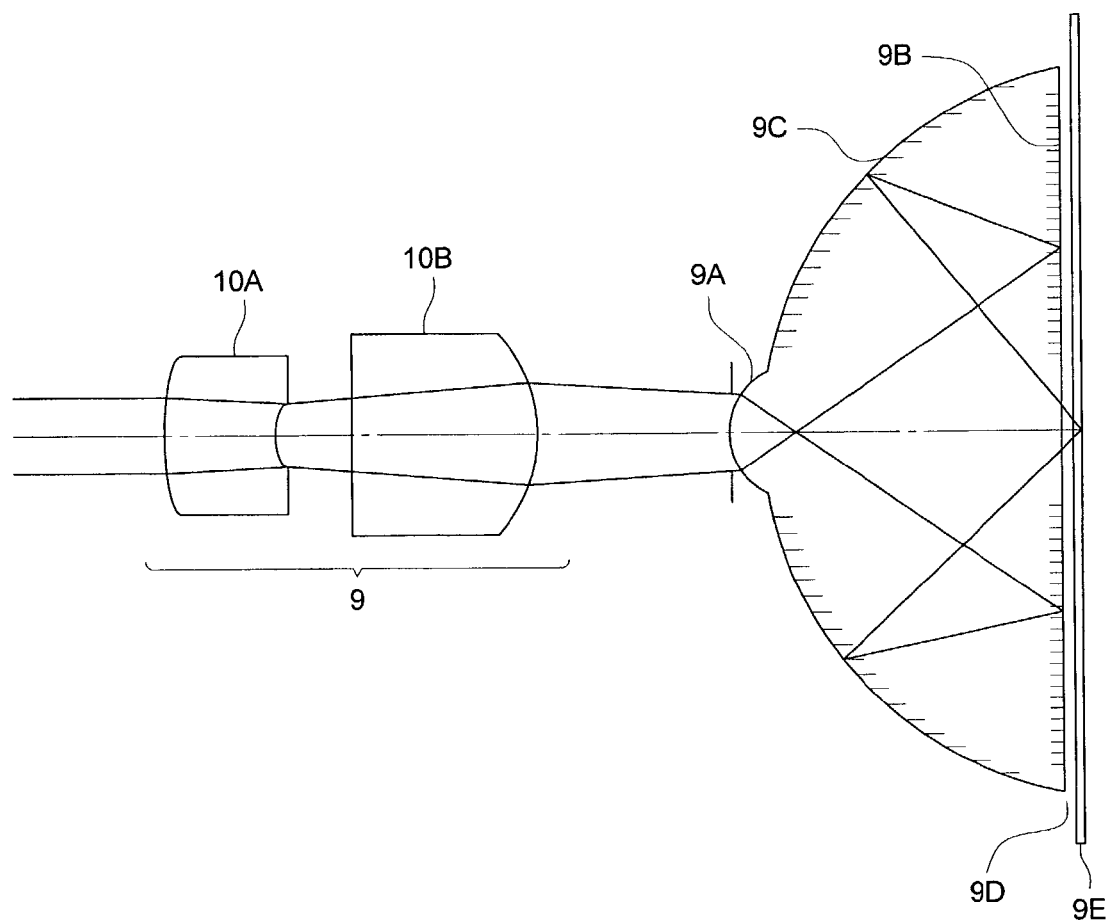
FIG. 14 shows the section and the light path of the corrective optical system and the optical element of Example (2).

FIG. 14 shows the section and the light path of the optical system wherein a corrective optical system is provided on the optical element of the present invention for Example (2). The optical element that is pre-positioned to the recording medium of the Example (2) is composed of first refractive interface 9A which is an aspheric surface convex to the light source side, second reflective surface 9B which is a flat surface, and whose central section is transmittable for light, and third reflective surface 9C which is an aspheric surface convex to the light source side.

Near-field area 9D between the recording medium and the optical element, set to be 80 nm for the distance, performs the recording/reproducing with the near-field light. Incidentally, the near-field area is drawn exaggeratingly in the drawing.

Further, in the optical system of FIG. 14, there is provided corrective optical system 9 composed of two pieces of optical elements 10A and 10B, one has positive power and the other has negative power. By changing the position of the corrective optical element 10A positioned at the light source side to change the incident angle entering the last optical element, corrected are the change of the focus position caused by the manufacturing error of the optical system and the deterioration of the spherical aberration. The main designing data of the present example are shown as follows.

NA1.5,λ=660 nm, diameter of the entrance pupil 0.177 mm materials of the corrective optical element: plastic (movable element 10A), glass (fixed element 10B)

material of the optical element: telulight glass nd=2.07425, vd=19.7 material of the protective layer of the recording medium: polycarbonate nd=1.58300, vd=30.0, t=0.03 mm radius of curvature and an aspheric coefficient of the optical element: R1=0.122054 mm, k=−0.113808, A4=0.691710E+02, A6=−0.223000E+05, A8=0.250305E+07, A10=−0.665664E+08

R2=∞

R3=1.06447 mm, k=0.250611, A4=−0.412509E−12, A6=0.804737−E02, A8=−0.116780E+00

Incidentally, a composing number and a power composition of the corrective optical system are not limited to the above. Further, protective layer 9E having the thickness of 30 μm is provided on the recording surface of the optical recording medium, which prevents the deterioration of the regenerated signal, caused by the adhesion of dust or finger print, and a scratch, accordingly the optical disk can be taken out from the device for the handling.

Figure 15:
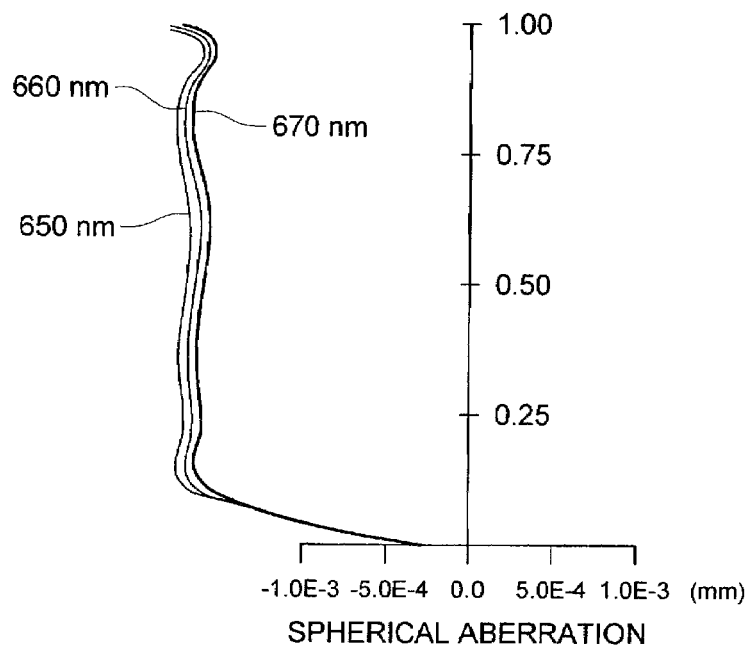
FIG. 15 is a drawing of spherical aberration in the case that the correction is not performed, when the on-axial thickness of the optical element increases 1 μm, in Example (2).
Figure 16:
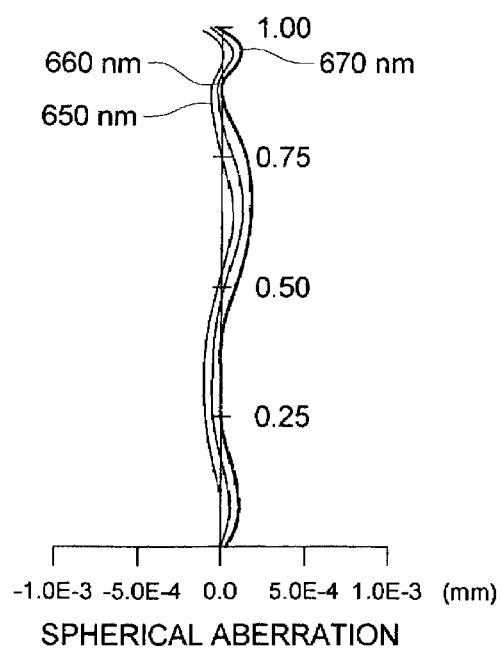
FIG. 16 is a drawing of spherical aberration, in the case that the correction is performed, when the on-axial thickness of the optical element increases 1 μm, in Example (2).

FIG. 15 shows the drawing of the spherical aberration in the case that an axial-thickness of the last optical element in FIG. 14 increases by 1 μm and the correction is not performed. It is impossible to read the appropriate reproducing signal under this condition, because the focal position (best image surface) has changed about 1.5 μm. On the other hand, FIG. 16 shows the drawing of the spherical aberration, in the case that the position of the corrective optical element 10A, having the one-axial electromagnetic actuator and positioning at the light source side, is changed in order to form the appropriate spot on the recording surface, for example. In this case, the moved length of the corrective optical element 10A is about 0.06 mm. That is, the remarkably changed focal position and the deterioration of the spherical aberration can be corrected on the recording surface, though the last optical element is not moved.

Figure 17:
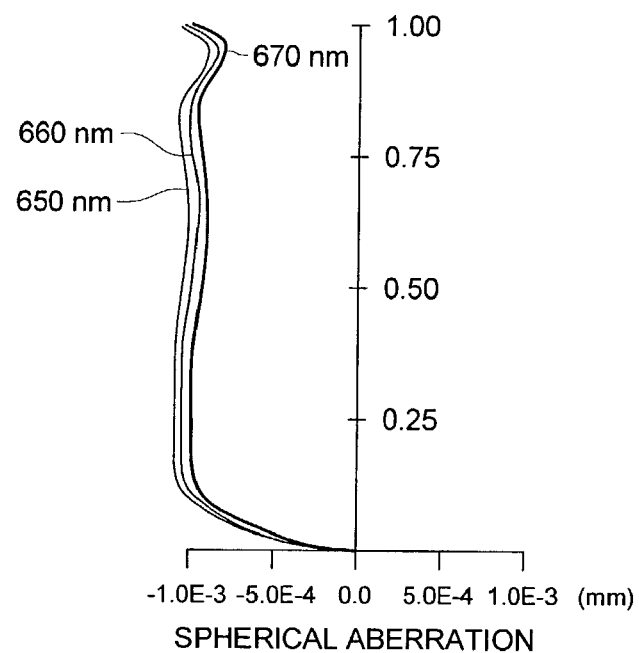
FIG. 17 is a drawing of spherical aberration, in the case that the correction is not performed, when the thickness of the protective layer of the recording medium increases 1 μm, in Example (2).
Figure 18:
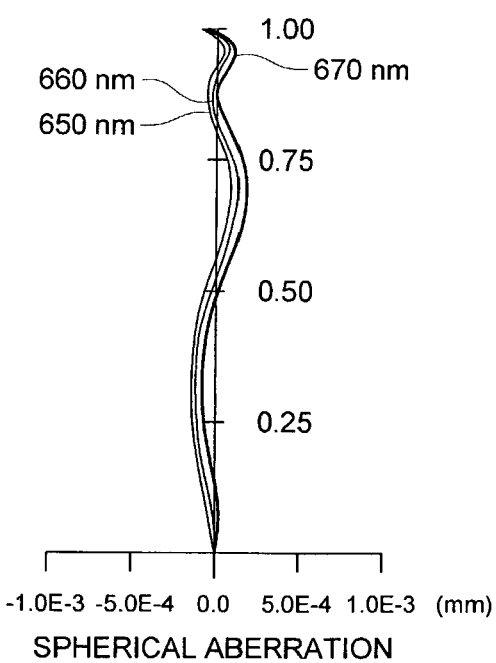
FIG. 18 is a drawing of spherical aberration, in the case that the correction is performed, when the thickness of the protective layer of the recording medium increases 1 μm, in Example (2).

FIG. 17 shows the drawing of the spherical aberration in the case that the thickness of the protective layer 9E in FIG. 14 increases about 1 μm and the correction is not performed. It is impossible to read the appropriate reproducing signal under this condition, because the focal position (the best image surface) has changed about 1 μm. On the other hand, FIG. 18 shows the drawing of the spherical aberration, in the case that the position of the corrective optical element 10A, having the one-axial electromagnetic actuator and positioning at the light source side, is changed in order to form the appropriate spot on the recording surface, for example. In this case, the moved length of the corrective optical element 10A is about 0.09 mm. That is, the remarkably changed focal position and the deterioration of the spherical aberration can be corrected on the recording surface, though the last optical element is not moved.

EXAMPLE (3)

Figure 19:
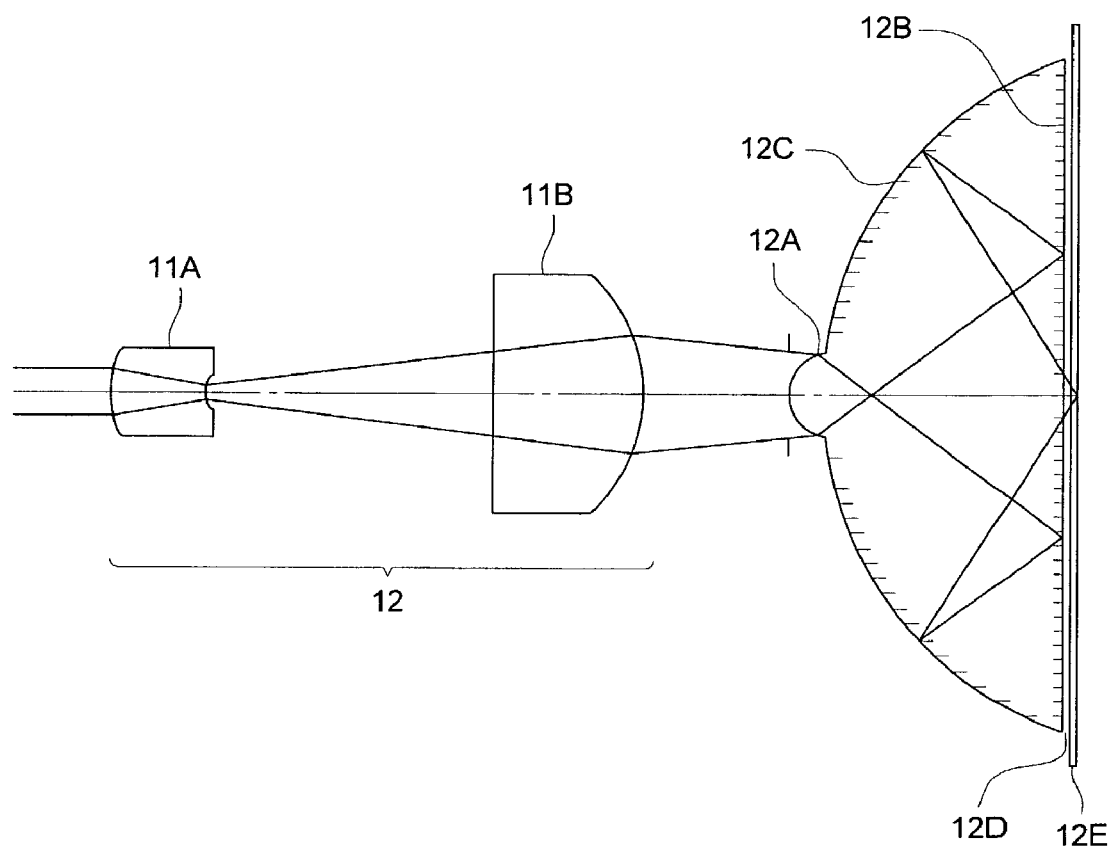
FIG. 19 shows the section and the light path of the corrective optical system and the optical element of Example (3).

FIG. 19 shows the section and the light path of the optical system wherein a corrective optical system is provided on the optical element of the present invention for Example (3). The optical element that is pre-positioned to the recording medium in the present example is composed of first refractive interface 12A which is an aspheric surface convex to the light source side, second reflective surface 12B which is a flat surface, and whose central section is transmittable for light, and third reflective surface 12C which is an aspheric surface convex to the light source side. Near-field area 12D between the recording medium and the optical element, set to be 80 nm for the distance, performs the recording/reproducing with the near-field light. Incidentally, the near-field area is drawn exaggeratingly in the drawing. The present optical element can improve NA to 1.8, and in this case, and expected is the recording density of about 37.8 Mb/mm².

In the optical system shown in FIG. 19, there is provided corrective optical system 12 composed of two pieces of optical elements 11A and 11B, one has positive power and the other has negative power. By changing the position of the corrective optical element 11A positioned at the light source side to change the incident angle entering the last optical element, corrected are the change of the focus position caused by the manufacturing error of the optical system and the deterioration of the spherical aberration. The main designing data of the present example are shown as follows.

NA1.8,λ=660 nm, diameter of the entrance pupil 0.177 mm materials of the corrective optical element: plastic (movable element 11A), glass (fixed element 11B)

material of the optical element: telulight glass nd=2.07425, vd=19.7 material of the protective layer of the recording medium: polycarbonate nd=1.58300, vd=30.0, t=0.03 mm a radius of curvature and an aspheric coefficient of the optical element: R1=0.14021 mm, k=−0.894548, A4=−0.202392E+02, A6=0.357172E+04, A8=−0.125173E+06, A10=0.416737E+07

R2=∞

R3=1.05456 mm, k=−0.070577, A4=0.149562E−01, A6=−0.220887−E01, A8=0.132893E−01

Incidentally, a composing number and a power composition of the corrective optical system are not limited to the above. Further, protective layer 12E having the thickness of 30 μm is provided on the recording surface of the optical recording medium, which prevents the deterioration of the regenerated signal, caused by the adhesion of dust or finger print, and a scratch, accordingly the optical disk can be taken out from the device for the handling.

Figure 20:
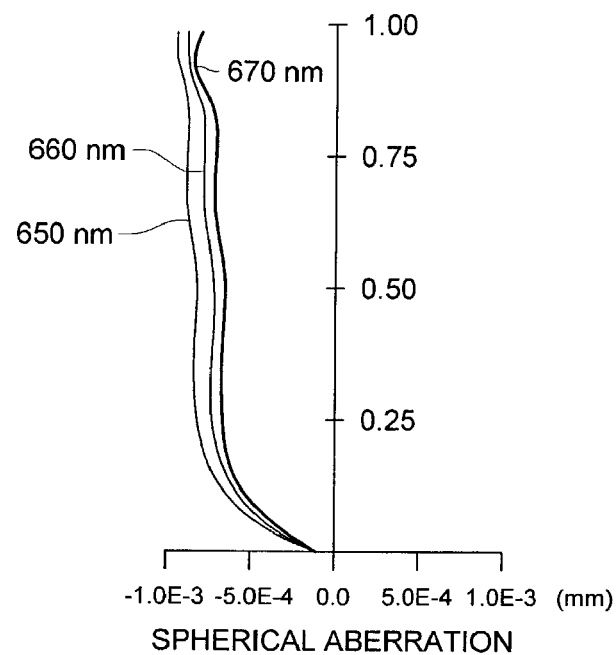
FIG. 20 is a drawing of spherical aberration, in the case that the correction is not performed, when the on-axial thickness of the optical element increases 1 μm, in Example (3).
Figure 21:
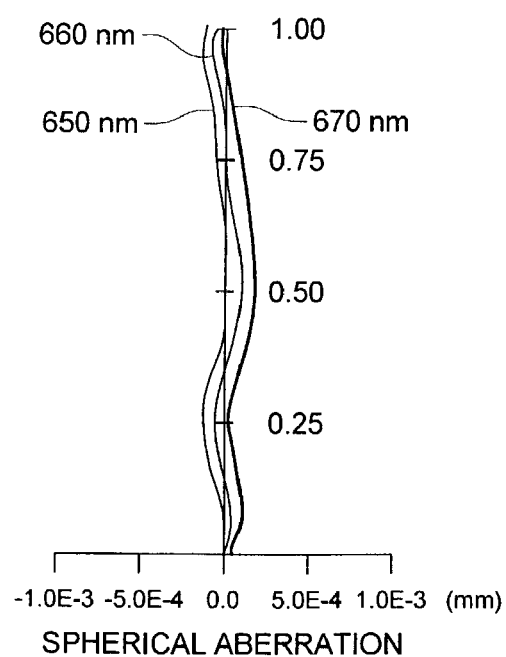
FIG. 21 is a drawing of spherical aberration, in the case that the correction is performed, when the on-axial thickness of the optical element increases 1 μm, in Example (3).

FIG. 20 shows the drawing of the spherical aberration in the case that an axial-thickness of the last optical element in FIG. 19 increases by 1 μm and the correction is not performed. The focal position (best image surface) is changed about 0.8 μm, and it is impossible to read the appropriate reproducing signal under this condition. On the other hand, FIG. 21 shows the drawing of the spherical aberration, in the case that the position of the corrective optical element 11A, having the one-axial electromagnetic actuator and positioning at the light source side, is changed in order to form the appropriate spot on the recording surface, for example. In this case, the moved length of the corrective optical element 11A is about 0.1 mm. That is, the remarkably changed focal position and the deterioration of the spherical aberration can be corrected on the recording surface, though the last optical element is not moved.

Figure 22:
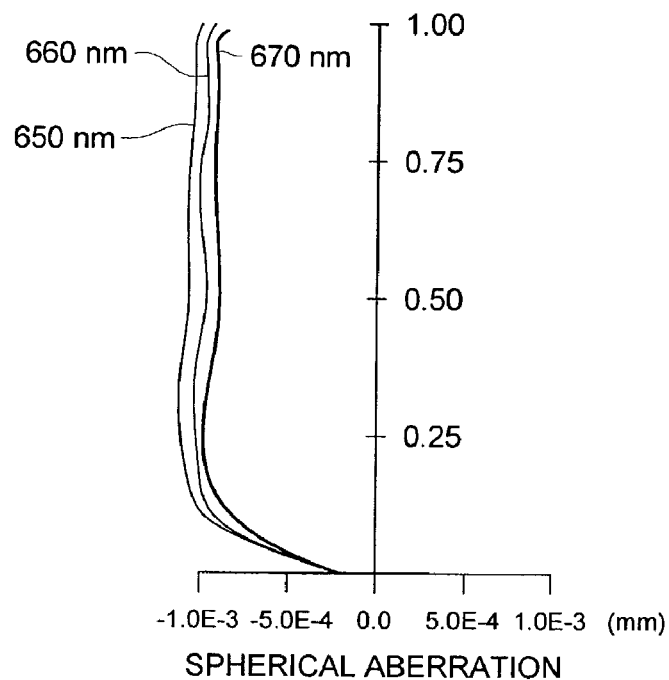
FIG. 22 is a drawing of spherical aberration, in the case that the correction is not performed, when the thickness of the protective layer of the recording medium increases 1 μm, in Example (3).
Figure 23:
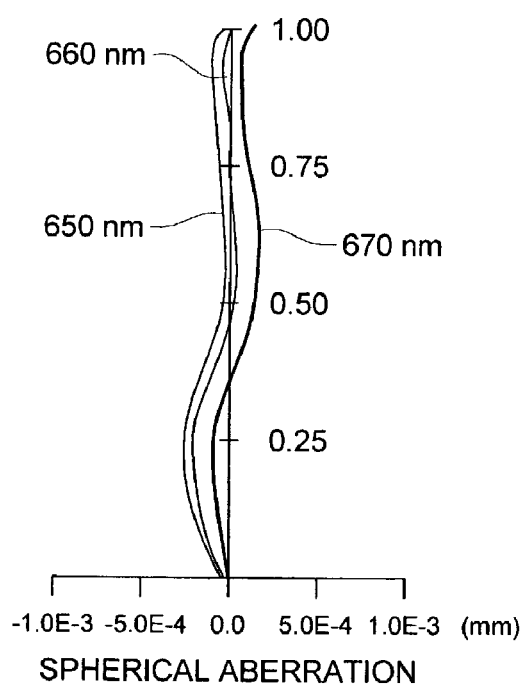
FIG. 23 is a drawing of spherical aberration, in the case that the correction is performed, when the thickness of the protective layer of the recording medium increases 1 μm, in Example (3).

FIG. 22 shows the drawing of the spherical aberration in the case that the thickness of the protective layer 12E in FIG. 19 increases about 1 μm and the correction is not performed. It is impossible to read the appropriate reproducing signal under this condition, because the focal position (the best image surface) has changed about 1 μm. On the other hand, FIG. 23 shows the drawing of the spherical aberration, in the case that the position of the corrective optical element 11A, having the one-axial electro-magnetic actuator and positioning at the light source side, is changed in order to form the appropriate spot on the recording surface, for example. In this case, the moved length of the corrective optical element 11A is about 0.13 mm. That is, the remarkably changed focal position and the deterioration of the spherical aberration can be corrected on the recording surface, though the last optical element is not moved.

EXAMPLE (4)

Figure 24:
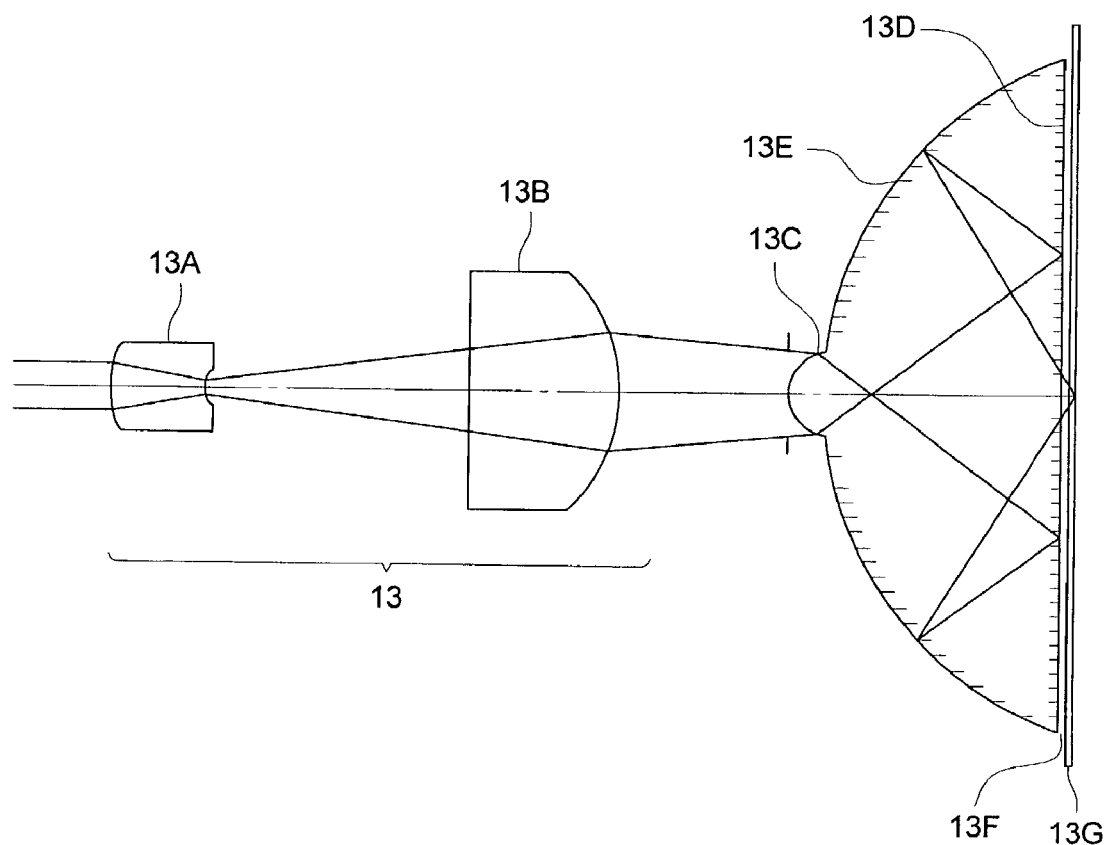
FIG. 24 shows the section and the light path of the corrective optical system and the optical element of Example (4).

FIG. 24 shows the section and the light path of the optical system wherein a corrective optical system is provided on the optical element of the present invention for Example (4). The optical element that is pre-positioned to the recording medium of the present example is composed of first refractive interface 13C which is an aspheric surface convex to the light source side, second reflective surface 13D which is a flat surface, and whose central section is transmittable for light, and third reflective surface 13E which is an aspheric surface convex to the light source side.

Near-field area 13F between the recording medium and the optical element, set to be 80 nm for the distance, performs the recording/reproducing with the near-field light. Incidentally, the near-field area is drawn exaggeratingly in the drawing.

NA is improved to 1.8, and a blue-purple laser having the wavelength of 405 nm is used for the light source, it is possible to increase the recording density to be about 100.3 Mb/mm$^2$, which is the value of about 23 times of DVD.

Further, in FIG. 24, there is provided corrective optical system 13 composed of two pieces of optical elements 13A and 13B, one has positive power and the other has negative power, on the optical system. By changing the position of the corrective optical element 13A positioned at the light source side to change the incident angle entering the last optical element, corrected are the change of the focus position caused by the manufacturing error of the optical system and the deterioration of the spherical aberration. The main designing data of the present example are shown as follows.

NA1.8, λ=405 nm, diameter of the entrance pupil=0.177 mm materials of the corrective optical element: plastic (movable element 13A), glass (fixed element 13B)

material of the optical element: telulight glass nd=2.07425, vd=19.7 material of the protective layer of the recording medium: polycarbonate nd=1.58300, vd=30.0, t=0.03 mm a radius of curvature and an aspheric coefficient of the optical element: R1=0.15474 mm, k=−0.891062, A4=−0.179563E+02, A6=0.237689E+04, A8=−0.698208E+05, A10=0.176427E+07

R2=∞

R3=1.05004 mm, k=−0.068481, A4=0.176602E−01, A6=−0.251841E−01, A8=0.160646E−01

Incidentally, a composing number and a power composition of the corrective optical system are not limited to the above. Further, protective layer 13G having the thickness of 30 μm is provided on the recording surface of the optical recording medium, which prevents the deterioration of the regenerated signal, caused by the adhesion of dust or finger print, and a scratch, accordingly the optical disk can be taken out from the device for the handling.

Figure 25:
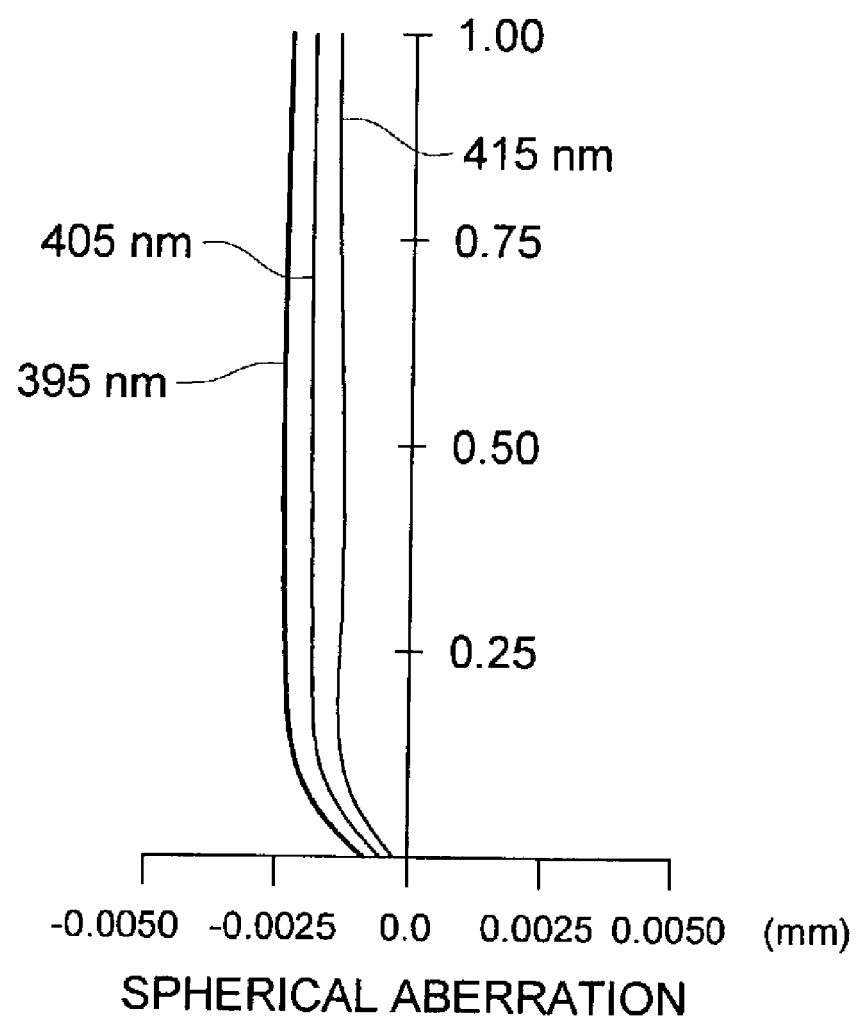
FIG. 25 is a drawing of spherical aberration, in the case that the correction is not performed, when the on-axial thickness of the optical element increases 1 μm, in Example (4).
Figure 26:
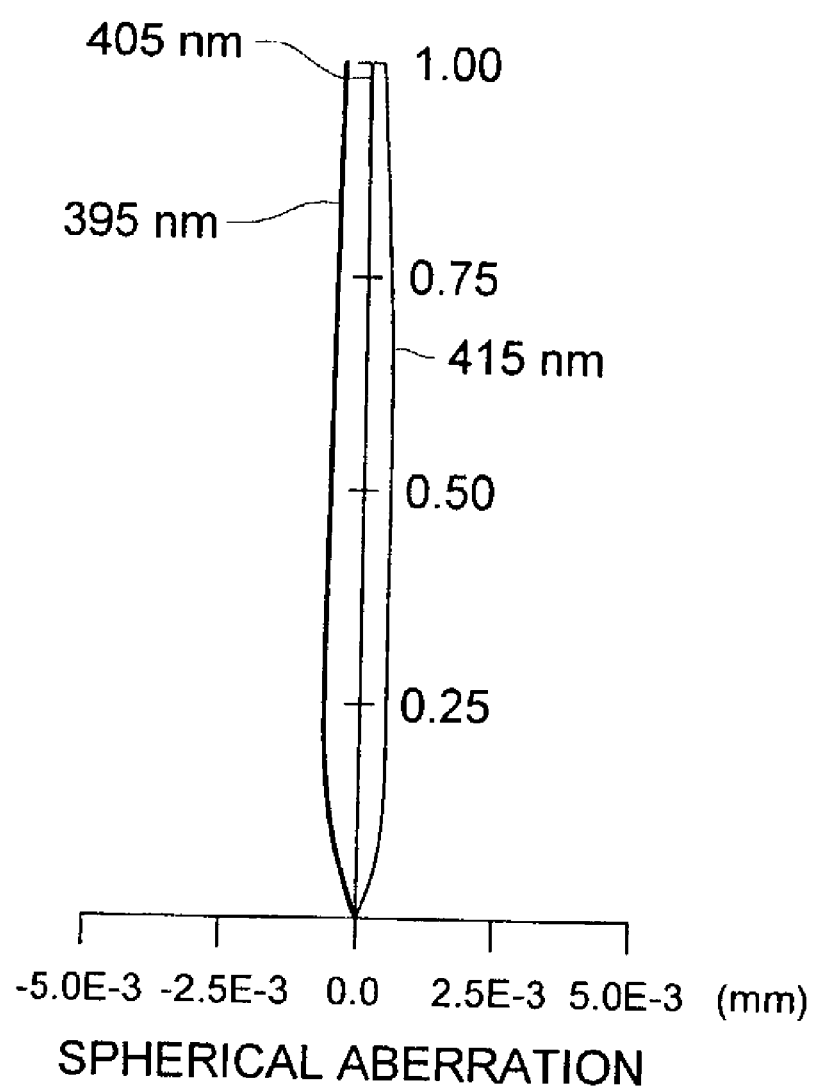
FIG. 26 is a drawing of spherical aberration, in the case that the correction is performed, when the on-axial thickness of the optical element increases 1 μm, in Example (4).

FIG. 25 shows the drawing of the spherical aberration in the case that an axial-thickness of the last optical element in FIG. 24 increases by 1 μm and the correction is not performed. The focal position (best image surface) is changed about 2.0 μm, and it is impossible to read the appropriate reproducing signal under this condition. On the other hand, FIG. 26 shows the drawing of the spherical aberration, in the case that the position of the corrective optical element 13A, having the one-axial electro-magnetic actuator and positioning at the light source side, is changed in order to form the appropriate spot on the recording surface, for example. In this case, the moved length of the corrective optical element 13A is about 0.06 mm. That is, the remarkably changed focal position and the deterioration of the spherical aberration can be corrected on the recording surface, though the last optical element is not moved.

Figure 28:
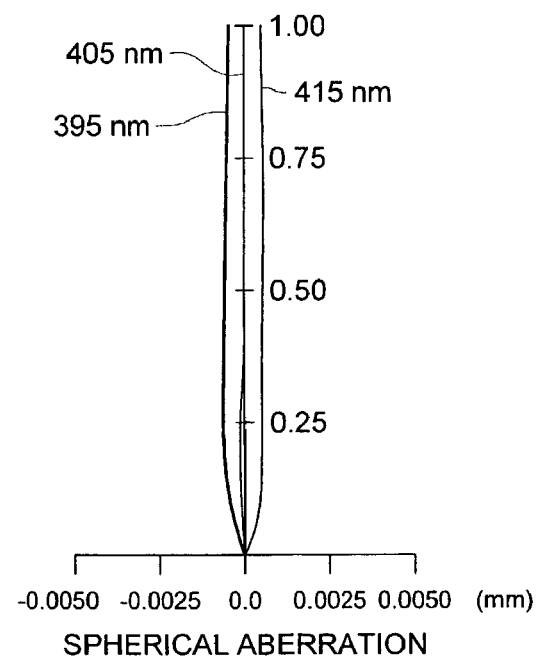
FIG. 28 is a drawing of spherical aberration, in the case that the correction is performed, when the thickness of the protective layer of the recording medium increases 1 μm, in Example (4).
Figure 29:
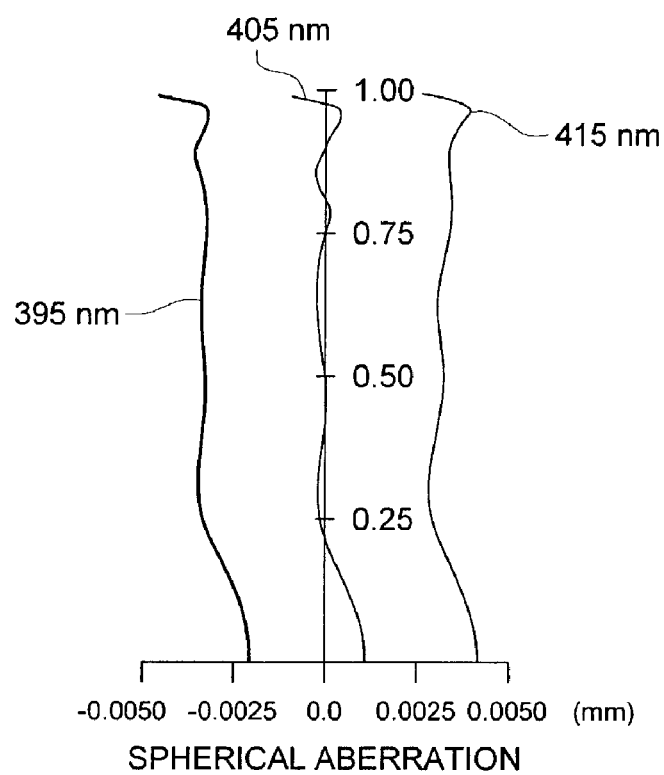
FIG. 29 is a drawing of spherical aberration on the conventional usual refractive objective lens.

Further, the light source having the short wavelength of 405 nm is employed in this example, however, in the case of a refractive objective lens, belonging to the normal class of NA0.85, it is general that the other corrective method for the chromatic aberration is needed. Giving an example, FIG. 29 shows the drawing of the spherical aberration of the single objective lens, NA0.85, λ=405 nm. A large axial chromatic aberration is generated by the wavelength change of ±1 nm, and the correct recording/reproducing of information cannot be performed by the wavelength change of the light source caused by the temperature change of the environment. However, though the present example has obtained NA1.8, as shown in each drawing of the spherical aberrations shown in FIGS. 25 to 28, longitudinal chromatic aberration to ±10 nm is not deteriorated remarkably, and the correct recording/reproducing of information can be performed, though there is the wavelength change of ±10 nm caused by the temperature change or the switchover time of output.

Figure 27:
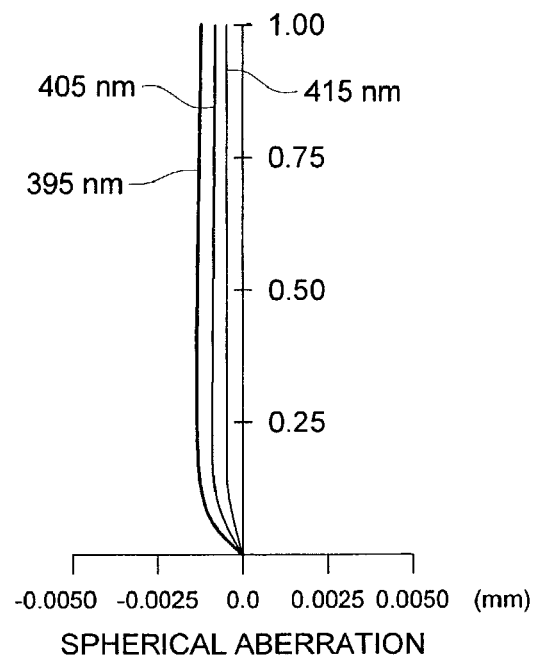
FIG. 27 is a drawing of spherical aberration, in the case that the correction is not performed, when the thickness of the protective layer of the recording medium increases 1 μm, in Example (4).

FIG. 27 shows the drawing of the spherical aberration in the case that the thickness of the protective layer 13G in FIG. 24 increases about 1 μm and the correction is not performed. It is impossible to read the appropriate reproducing signal under this condition, because the focal position (the best image surface) has changed about 1 μm. On the other hand, FIG. 28 shows the drawing of the spherical aberration, in the case that the position of the corrective optical element 13A, having the one-axial electro-magnetic actuator and positioning at the light source side, is changed in order to form the appropriate spot on the recording surface, for example. In this case, the moved length of the corrective optical element 13A is about 0.08 mm. That is, the remarkably changed focal position and the deterioration of the spherical aberration can be corrected on the recording surface, though the last optical element is not moved.

Figure 30:
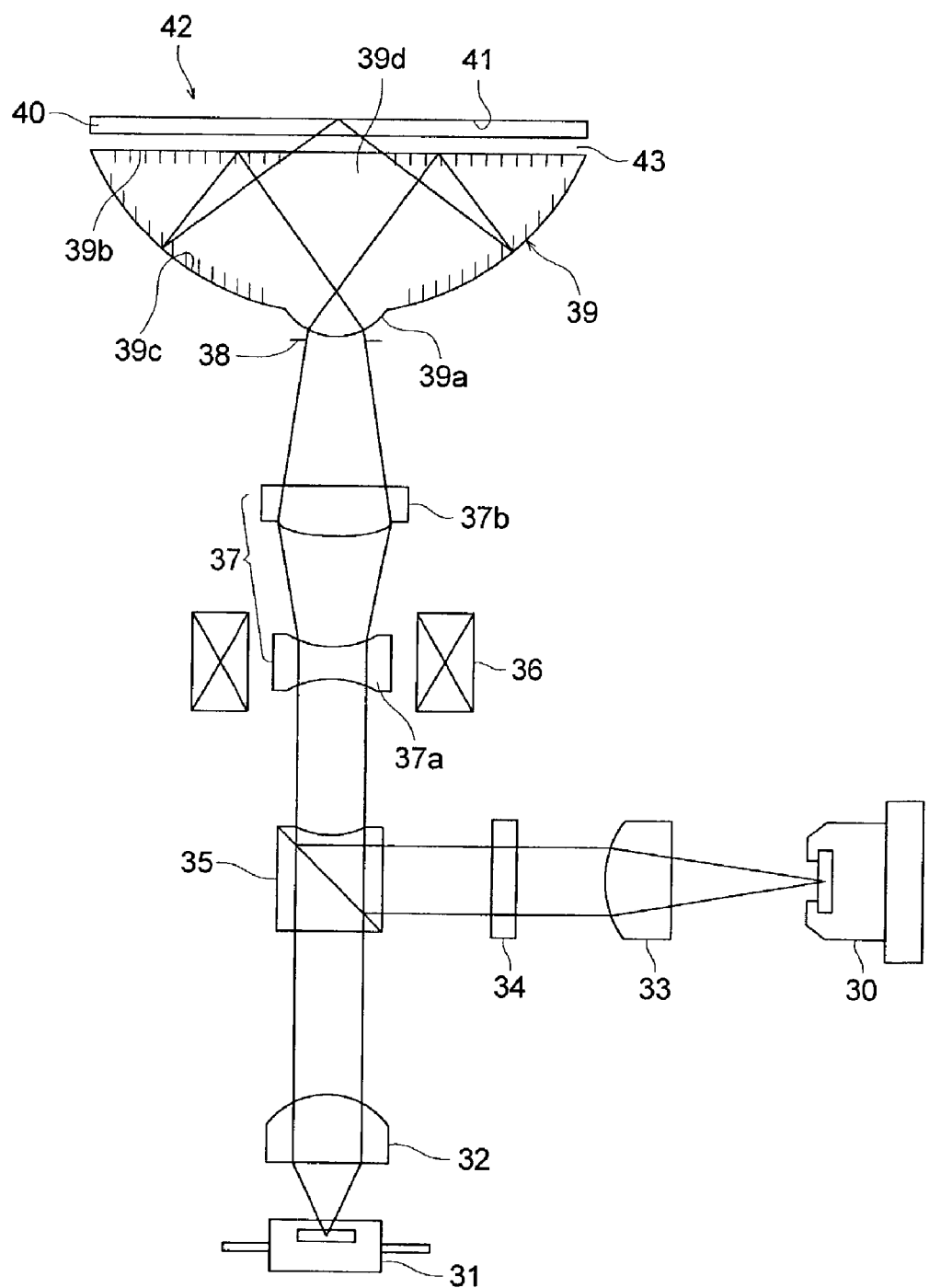
FIG. 30 is a drawing showing a schematic structure of the optical pick-up device of the embodiment of the present invention.

Next, the optical pick-up device relating to the embodiment of the invention is explained referring to FIG. 30.

As shown in FIG. 30, the optical pick-up device is composed of laser diode 30 representing the light source, collimator 33 and diffraction grating 34 in which the light from the laser diode 30 passes, beam splitter 35 which reflects the light from the laser diode 30, corrective optical system 37, diaphragm 38, optical element 39 which converges the light on information recording surface 41 through protective layer 40 of optical information recording medium 42, and optical detector 31 which the reflected light from the information recording surface 41 enters after passing through the beam splitter 35 and the collimator 32, and is able to perform the recording and reproducing of information for the optical information recording medium.

The optical element 39 described in FIG. 30 is formed in the way that light passed through the diaphragm 38 is refracted on first refractive interface 39a, which is formed around the optical axis to be convex, and enters the optical element 39, then light is reflected on second reflective surface 39b, next light is reflected on third reflective surface 39c, and light exits from light transmittance section 39d in the center section of the second reflective surface 39b, accordingly, the optical element 39 can be an optical element that is described in Examples 1 to 4, for example.

Further, the corrective optical system 37 is arranged between the beam splitter 35 and the diaphragm 38, and has optical movable element 37a having negative power and optical fixed element 37b having positive power, arranged at the light source side.

Further, when one-axial actuator 36 makes the optical movable element 37a of the corrective optical system 37 to change the position to the direction of the optical axis, the diverged angle of the diverged light from the optical movable element 37a is changed so that the incident angle to the first refractive surface 39a of the optical element can be changed, and due to this, it is possible to correct the change of the focal position and the deterioration of the spherical aberration, caused by the manufacturing error of the optical system representing the on-axial thickness error of the optical element 39 and the thickness error of the protective layer 40 of the optical information recording medium 42.

Incidentally, it is possible to make the position of the optical fixed element 37b to change to the direction of optical axis, as the same manner as mentioned above.

The near-field area 43 is formed between the second reflective surface 39b of the optical element 39 and the optical information recording medium 42, with the distance shorter than the wavelength of the light source, and light from the light transmitting section 39d of the optical element 39 leaks in the near-field area 43, to be the near-field light.

Figure 1:
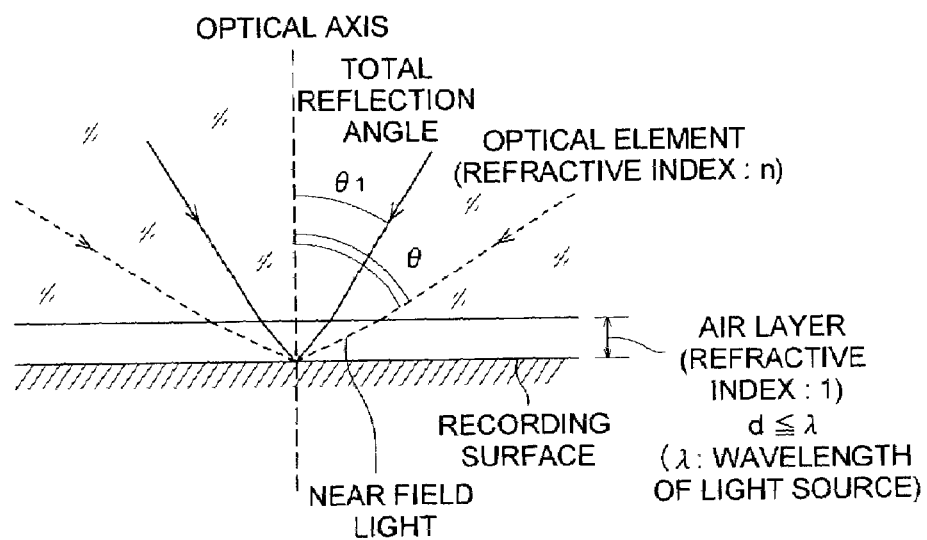
FIG. 1 is a drawing explaining a principle of the near-field light employed in the present invention.
Figure 2:
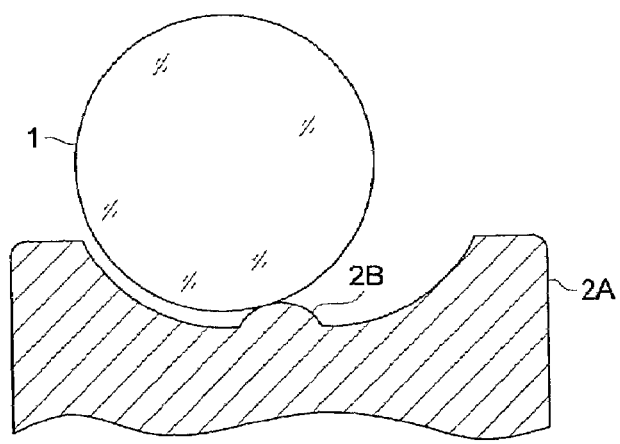
FIG. 2 is a drawing showing the positional relation between the pre-form and the lower metal mold, just before molding the conventional optical element with the glass mold.
Figure 3:
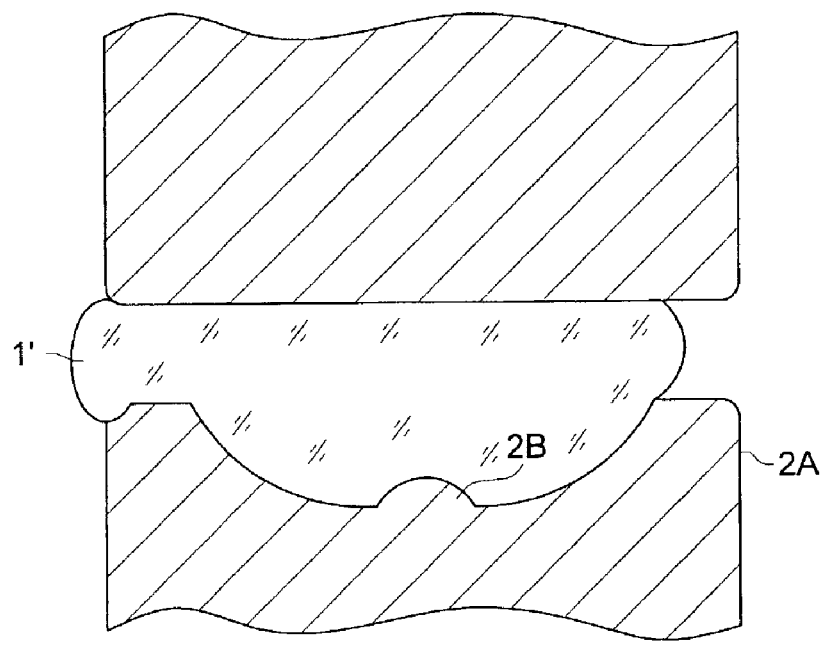
FIG. 3 is a drawing showing the shape of the optical element which was molded with the glass mold shown in FIG. 2.
Figure 4:
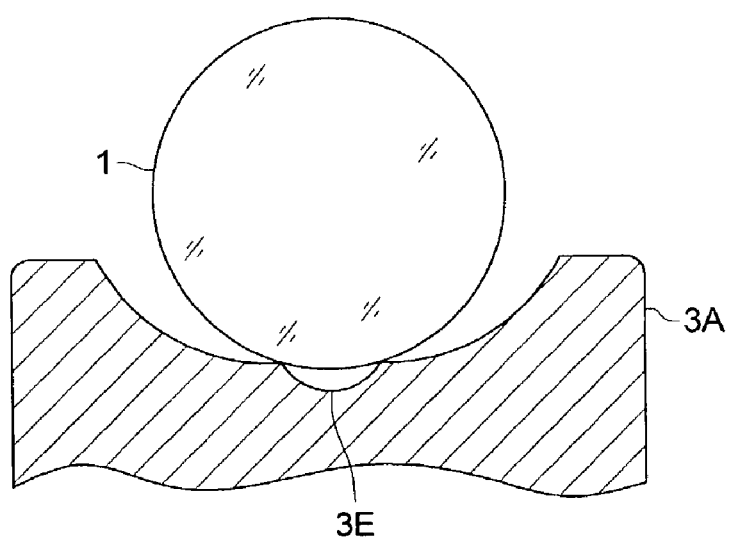
FIG. 4 is a drawing showing the positional relation between the pre-form and the lower metal mold, just before molding the optical element of the present invention with the glass mold by the manufacturing method of the present invention.
Figure 5:
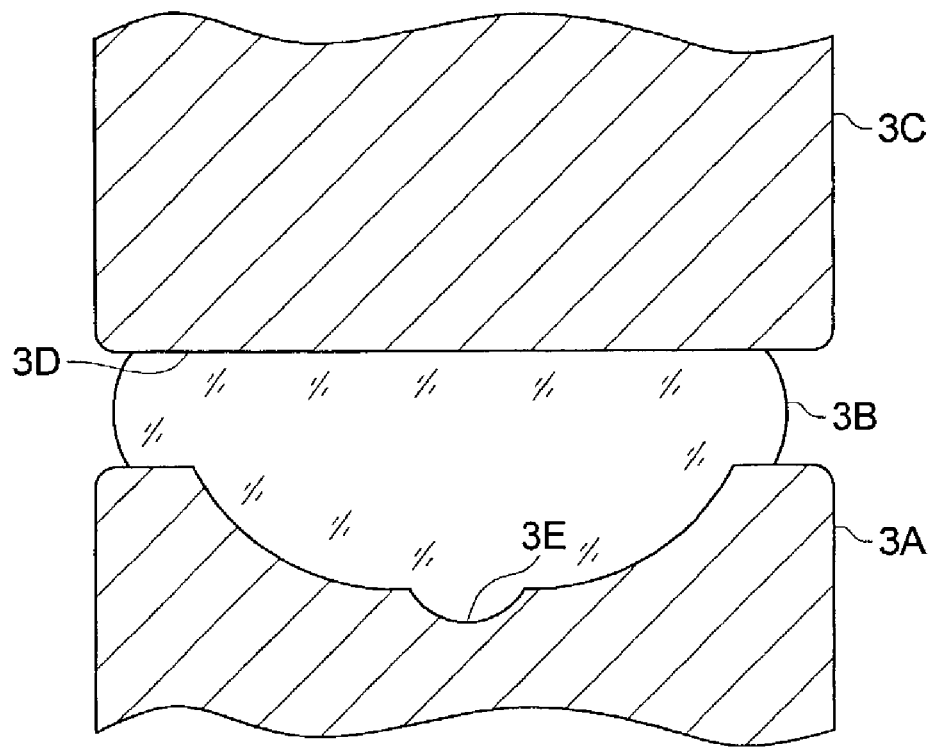
FIG. 5 is a drawing showing the shape of the optical element which was molded in FIG. 4, and the upper metal mold and the lower metal mold.
Figure 6:
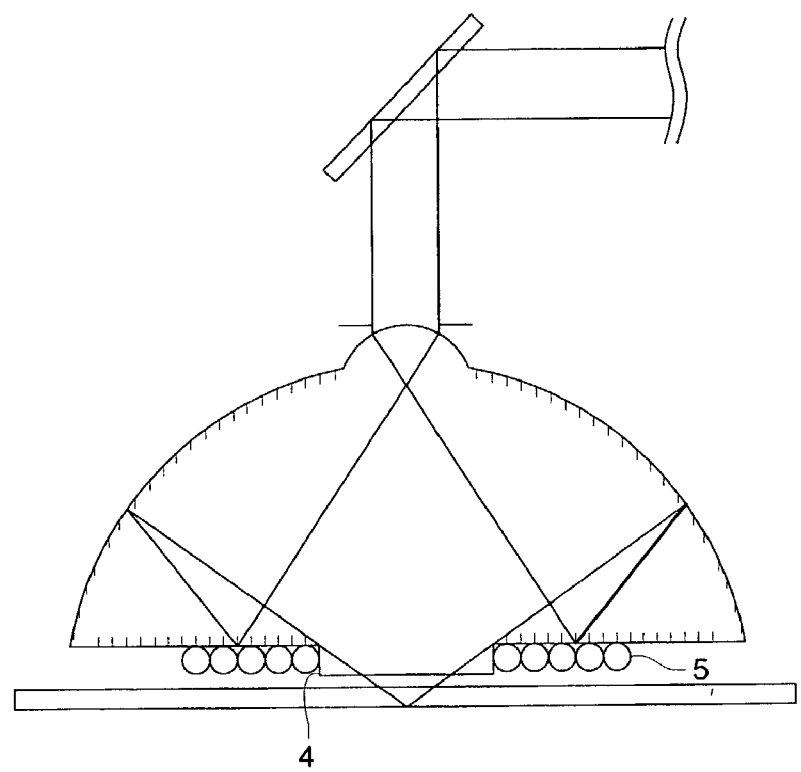
FIG. 6 is a schematic diagram when the optical element of the present invention is applied to the photomagnetic recording.
Figure 7:
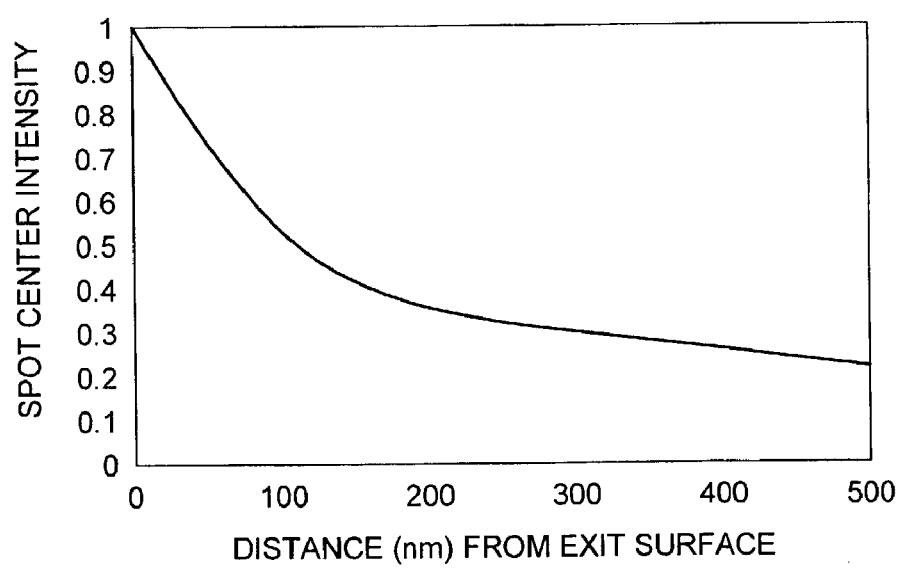
FIG. 7 shows a light intensity profile compared at each leaking position of the near-field light.
Figure 8:
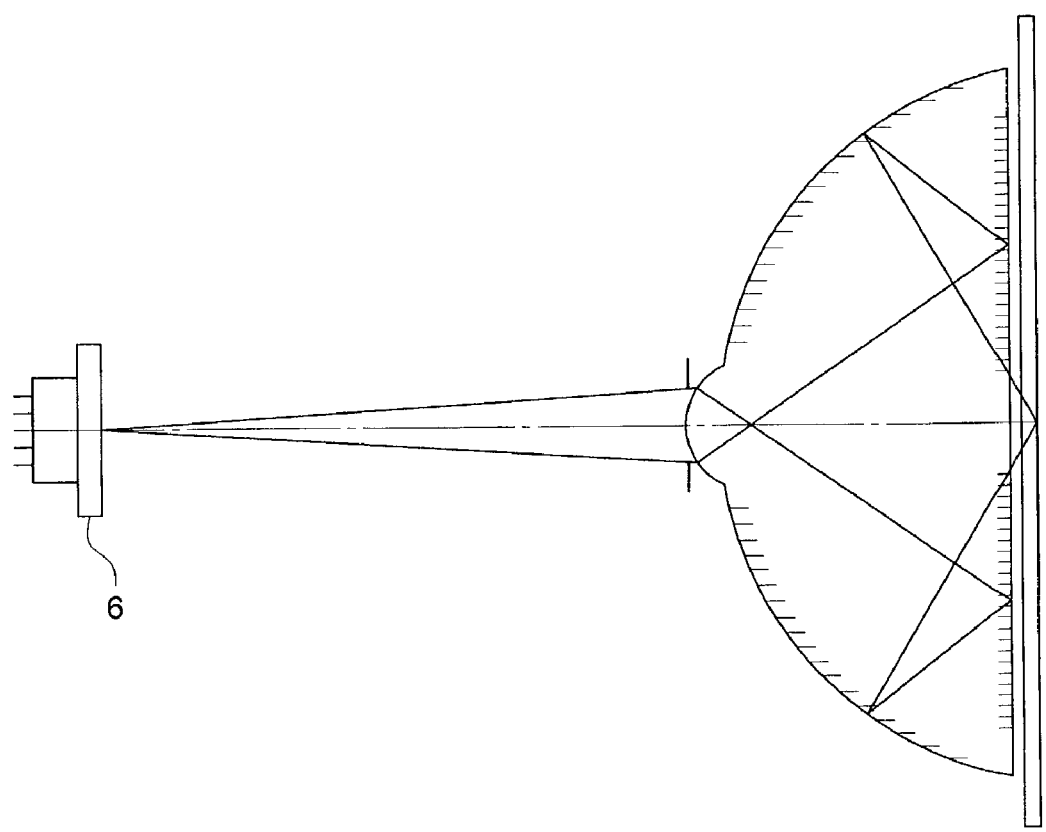
FIG. 8 is a schematic diagram when the optical element of the present invention is used for the finite conjugate type.
Figure 9:
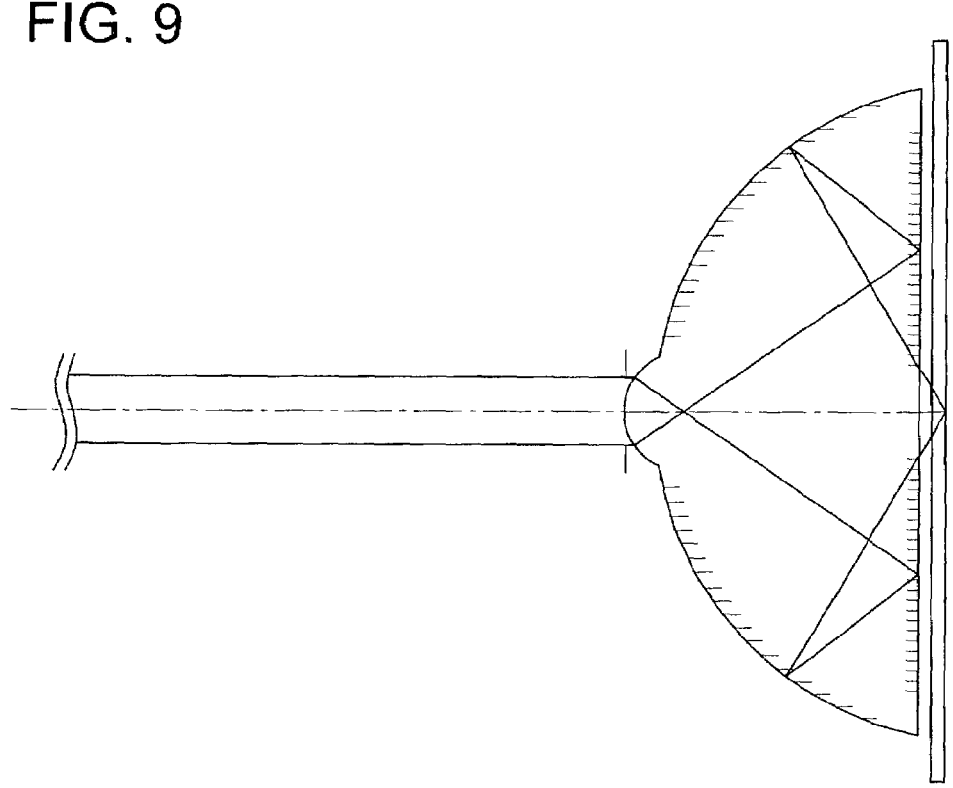
FIG. 9 is a schematic diagram when the optical element of the present invention is used for the infinite conjugate type.
Figure 10:
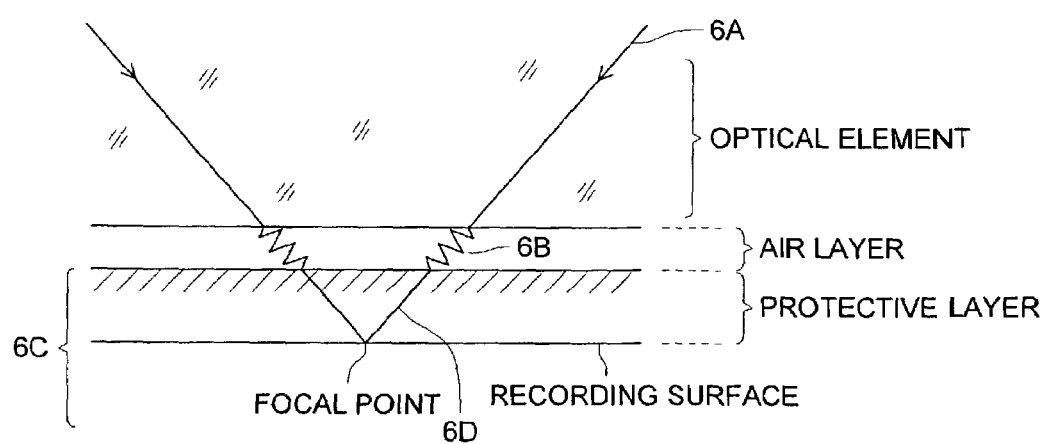
FIG. 10 is a drawing explaining that the near-field light can travel through the protective layer of the recording medium.
Figure 11:
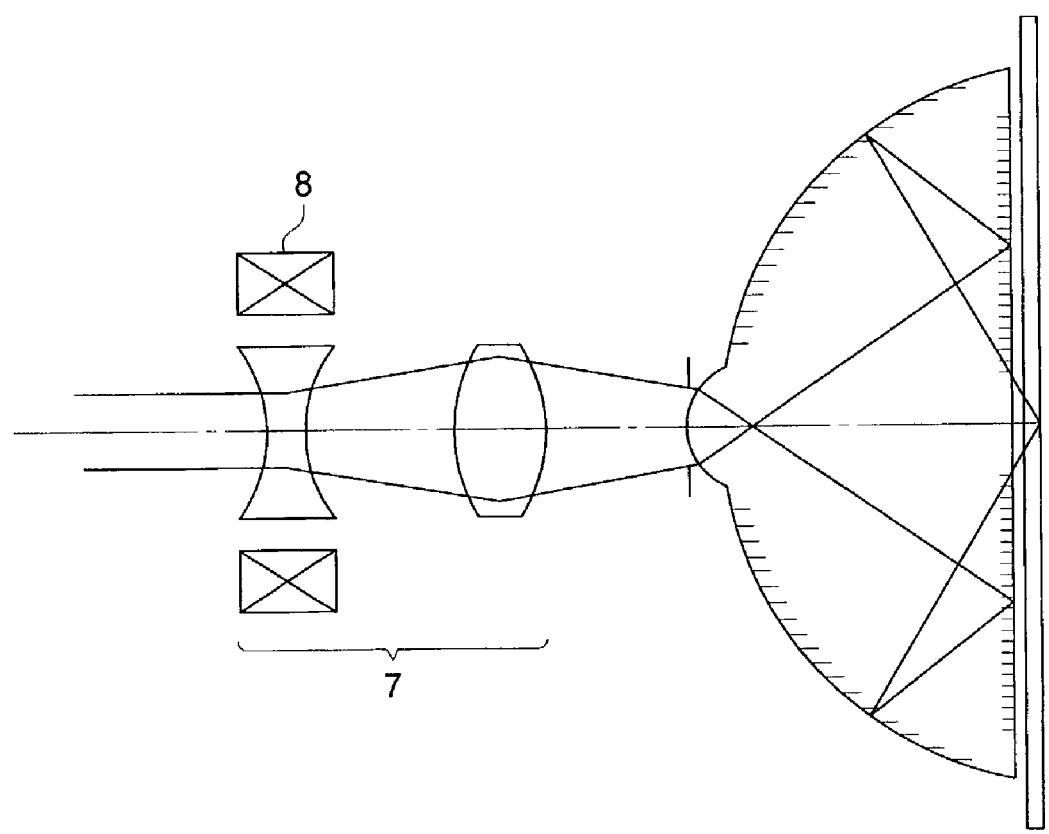
FIG. 11 is a schematic diagram of the light-converging optical system in which the corrective optical system is arranged to the optical element of the present invention.

The movement of the reproducing by the optical pick-up device shown in FIG. 30 is described as follows. After the light from the laser diode 30 passes through the collimator 33, the diffraction grating 34, the beam splitter 35, the corrective optical system 37, and the diaphragm 38, the light from laser diode 30 enters the first refractive interface 39a of the optical element 39, and is reflected on the second reflective surface 39b and the third reflective surface 39c, then the light leaks from the light transmitting section 39d of the second reflective surface 39b into the near-field area 43 to be the near-field light, described in FIG. 10, and the near-field light is changed to the normal light in the protective layer 40 of the optical information recording medium 42 to reach the information recording surface 41. When the light is reflected on the information recording surface 41, the light is modulated by the recorded information on the information recording surface 41, and travels through the above-mentioned path in the opposite direction, then enters the optical detector 31 through the beam splitter 35 and the collimator 32, to complete the recording of information recorded on the information recording surface. Further, the recording of information is performed in the same way as the case of the reproducing, mentioned above.

As mentioned above, since the optical element of the invention is arranged in front of the optical information recording medium to employ the near-field light, the optical pick-up device shown in FIG. 30 can obtain the high NA, which can realize the recording/reproducing having the high recording density. Further, by providing the corrective optical system, corrected are the change of the focus position caused by the manufacturing error of the optical system and the deterioration of the spherical aberration, which can perform recording/reproducing of information with high accuracy.

Employing the near-field light, he present invention can provide the optical element which can improve the recording density greatly compared with the conventional optical information recording, and the optical pick-up device using the optical element.

Further, the present invention can provide the manufacturing method of the optical element which adjusts excellently the setting position of the molding material such as a pre-form for molding the optical element in the glass molding method, and can obtain the excellent optical characteristics of the molded optical element.

Still further, the present invention can provide the optical element and the optical pick-up device which can excellently correct the change of the focal position caused by manufacturing error of the optical system, representing the axial thickness error of the optical element and the thickness error of the protective layer of the recording medium, and the spherical aberration.

What is claimed is:

1. An optical element for recording and/or reproducing information of an optical information recording medium, comprising:
    an optical element body having an incident surface and an opposite surface opposite to the incident surface, wherein a light flux coming from a light source at an outside is introduced to be incident into an inside of the optical element body and is reflected several times in the inside of the optical element body so that the light flux is converged on the opposite surface; and
    wherein the incident surface comprises:
        a convex region including an optical axis; and
        a surrounding region surrounding the convex region and having a different radius of curvature from a radius of curvature of the convex region and
        the convex region is a refractive surface and is convex toward the light source side.

2. The optical element of claim 1, further comprising:
    a diaphragm to regulate an unnecessary light flux for recording and/or reproducing information.

3. The optical element of claim 1, wherein the optical element body comprises a first refractive surface which is convex toward the light source side and has a predetermined region on the optical axis; a second reflective surface to reflect a light flux from the first refractive surface; and a third reflective surface to reflect again the light flux reflected from the second reflective surface;
    wherein the second reflective surface includes a light transmitting section to emit the light flux at a central section around the optical axis and the following conditional formulas are satisfied:

$$0 < R_1 < R_3 < R_2$$

$$n_d \geq 1.55$$

where R1 is a radius of curvature of the first refractive surface (in the case of an aspherical surface, R1 is a paraxial radius of curvature);

R2 is a radius of curvature of the second reflective surface (in the case of an aspherical surface, R2 is a paraxial radius of curvature);

R3 is a radius of curvature of the third reflective surface (in the case of an aspherical surface, R3 is a paraxial radius of curvature); and nd is a refractive index of a material forming an optical element for d-line.

4. The optical element of claim 3, wherein the second reflective surface is a flat surface.

5. The optical element of claim 3, wherein the second reflective surface includes a convex which is located at a central section around the optical axis and protrudes toward the optical information recording medium.

6. The optical element of claim 1, wherein the optical element is arranged such that a distance between a final surface of the optical element and the optical information recording medium is not larger than a wavelength of a used light flux.

7. The optical element of claim 1, wherein the optical element is a finite conjugate type to converge a divergent light flux from the light source onto the optical information recording medium.

8. The optical element of claim 1, wherein the optical element is an infinite conjugate type to converge a parallel light flux from the light source onto the optical information recording medium.

9. The optical element of claim 1, wherein the optical information recording medium comprises a protective layer on an information recording plane.

10. The optical element of claim 9, wherein the thickness of the protective layer is 50 nm to 1 mm.

11. The optical element of claim 1, wherein the optical element is made of an optical glass material.

12. The optical element of claim 1, wherein the optical element is made of an optical plastic material.

13. An optical pickup apparatus, comprising:
    a light source to emit a light flux;
    an optical element to converge the light flux from the light source onto an information recording plane of an optical information recording medium; and
    a photo-detector to detect the light flux from the optical information recording medium;
    wherein an optical element body of the optical element has an incident surface and an opposite surface opposite to the incident surface, the light flux coming from the light source is introduced to be incident into an inside of the optical element body and is reflected several times in the inside of the optical element body so that the light flux is converged on the opposite surface, and
    wherein the incident surface comprises:
        a convex region including an optical axis; and
        a surrounding region surrounding the convex region and having a different radius of curvature from a radius of curvature of the convex region and
    the convex region is a refractive surface and is convex toward the light source side.

14. The optical pickup apparatus of claim 13, further comprising:
    a diaphragm to regulate an unnecessary light for recording an/or reproducing information.

15. The optical pickup apparatus of claim 13, wherein the optical element body comprises a first refractive surface which is convex toward the light source side and has a predetermined region on the optical axis; and second reflective surface to reflect a light flux form the first refractive surface; and a third reflective surface to reflect again the light flux reflected from the second reflective surface;
    wherein the second reflective surface includes a light transmitting section to emit the light flux at a central section around the optical axis and the following conditional formulas are satisfied:

$0<R1<R3<R2$ $nd \geq 1.55$ where R1 is a radius of curvature of the first refractive surface (in the case of an aspherical surface, R1 is a paraxial radius of curvature);
    R2 is a radius of curvature of the second reflective surface (in the case of an aspherical surface, R2 is a paraxial radius of curvature);
    R3 is a radius of curvature of the third reflective surface (in the ease of an aspherical surface, R3 is a paraxial radius of curvature); and nd is a refractive index of a material forming an optical element for d-line.

16. The optical pickup apparatus of claim 15, wherein the second reflective surface is a flat surface.

17. The optical pickup apparatus of claim 15, wherein the second reflective surface includes a convex which is located at a central section around the optical axis and protrudes toward the optical information recording medium.

18. The optical pickup apparatus of claim 13, wherein the optical element is arranged such that a distance between a final surface of the optical element and the optical information recording medium is not larger than a wavelength of the used light flux.

19. The optical pickup apparatus of claim 13, wherein the optical element is a finite conjugate type to converge a divergent light flux from the light source onto the optical information recording medium.

20. The optical pickup apparatus of claim 13, wherein the optical element is an infinite conjugate type to converge a parallel light flux from the light source onto the optical information recording medium.

21. The optical pickup apparatus of claim 13, wherein the optical information recording medium comprises a protective layer on an information recording plane.

22. The optical pickup apparatus of claim 21, wherein the thickness of the protective layer is 50 nm to 1 mm.

23. The optical pickup apparatus of claim 13, wherein the optical element is made of an optical glass material.

24. The optical pickup apparatus of claim 13, wherein the optical element is made of an optical plastic material.

25. The optical pickup apparatus of claim 13, further comprising:
    a correcting optical system provided between the light source and the optical information recording medium and including one or more optical elements in which at least one optical element is a movable element so that focusing and correcting a spherical aberration are conducted by displacing the movable element along the optical axis between the light source and the optical information recording medium.

26. The optical pickup apparatus of claim 25, wherein the movable element is made of an optical plastic material.

* * * * *